United States Patent
Stefanko et al.

(10) Patent No.: US 9,327,905 B2
(45) Date of Patent: May 3, 2016

(54) CONVEYOR BELT MODULE WITH BEARING RETAINER

(71) Applicants: Justin Michael Stefanko, Greenfield, WI (US); Robert E. Mitchell, Milwaukee, WI (US)

(72) Inventors: Justin Michael Stefanko, Greenfield, WI (US); Robert E. Mitchell, Milwaukee, WI (US)

(73) Assignee: Rexnord Industries, LLC, Milwaukee, WI (US)

(*) Notice: Subject to any disclaimer, the term of this patent is extended or adjusted under 35 U.S.C. 154(b) by 78 days.

(21) Appl. No.: 13/905,378

(22) Filed: May 30, 2013

(65) Prior Publication Data
US 2013/0319829 A1   Dec. 5, 2013

Related U.S. Application Data

(60) Provisional application No. 61/652,936, filed on May 30, 2012.

(51) Int. Cl.
| | | |
|---|---|---|
| *B65G 17/06* | (2006.01) | |
| *B65G 15/30* | (2006.01) | |
| *B65G 17/08* | (2006.01) | |

(52) U.S. Cl.
CPC ............. *B65G 15/30* (2013.01); *B65G 17/086* (2013.01)

(58) Field of Classification Search
CPC ....................................................... B65G 21/16
USPC .................................................. 198/850–853
See application file for complete search history.

(56) References Cited

U.S. PATENT DOCUMENTS

| | | | | |
|---|---|---|---|---|
| 5,076,422 A | * | 12/1991 | Clopton | B65G 17/086 198/838 |
| 5,429,227 A | * | 7/1995 | Krossmann | B65G 21/22 198/852 |
| 5,573,105 A | | 11/1996 | Palmaer | |
| 5,775,480 A | * | 7/1998 | Lapeyre et al. | 198/831 |
| 5,906,270 A | * | 5/1999 | Faulkner | B65G 17/086 198/853 |
| 6,216,851 B1 | * | 4/2001 | Mitas et al. | 198/844.2 |

(Continued)

FOREIGN PATENT DOCUMENTS

| | | |
|---|---|---|
| EP | 0 680 898 A1 | 11/1995 |
| EP | 1 260 459 A1 | 11/2002 |
| EP | 1 739 034 A1 | 1/2007 |

OTHER PUBLICATIONS

PCT/US2013/043291, International Search Report & Written Opinion, Sep. 23, 2013.

(Continued)

*Primary Examiner* — Gene Crawford
*Assistant Examiner* — Lester Rushin
(74) *Attorney, Agent, or Firm* — Quarles & Brady LLP

(57) ABSTRACT

A conveyor belt module includes a body, a link end formed by the body, and an opening through the link end along a hinge axis. A cover extends from the body in a direction of the hinge axis and a post extends from the cover; a bearing is rotatably engaged with the post. A fastener engages the post to capture the bearing between the cover and the fastener, such that the bearing is housed at least partially between the upper and lower extremes of the body. A track for supporting and guiding the conveyor belt module includes a guide arm extending into a guide channel defined by the body to engage the bearing. The conveyor belt module may also include laterally offset protrusions extending from the link end in opposite directions to inhibit engagement with a drive member.

17 Claims, 28 Drawing Sheets

(56) References Cited

U.S. PATENT DOCUMENTS

| | | |
|---|---|---|
| 7,070,043 B1 | 7/2006 | MacLachlan et al. |
| 7,234,589 B2 | 6/2007 | Sedlacek |
| 7,252,192 B2 * | 8/2007 | Stebnicki et al. ............. 198/845 |
| 8,453,827 B2 | 6/2013 | Corley et al. |
| 2009/0199375 A1 * | 8/2009 | Koelling et al. ................ 24/700 |
| 2011/0062001 A1 | 3/2011 | Garbagnati et al. |
| 2013/0337397 A1 * | 12/2013 | Curiel et al. .................... 433/11 |

OTHER PUBLICATIONS

International Preliminary Report on Patentability for corresponding International Application No. PCT/US2013/043291; dated Dec. 2, 2014; 9 pages.

* cited by examiner

CONVEYOR BELT MODULE WITH BEARING RETAINER

CROSS REFERENCE TO RELATED APPLICATION

This application claims priority to U.S. provisional application No. 61/652,936 filed May 30, 2012, which is hereby incorporated by reference as if fully set forth herein.

STATEMENT REGARDING FEDERALLY SPONSORED RESEARCH

Not Applicable.

BACKGROUND OF THE INVENTION

The present invention relates to conveyor belt modules, and more particularly to a module having a bearing at least partially housed within the module to reduce drag friction, especially as the conveyor belt module traverses lateral curves.

Conveyor belt modules typically include opposing link ends that are coupled to offset link ends of an adjacent module by a series of generally parallel hinge pins to form a conveyor belt. The conveyor belt rides along an underlying track and, depending on the ultimate application and form factor, the overall conveyor belt can undergo a significant amount of tensile loading, especially as the conveyor belt modules traverse a lateral curve or bend. Much of the stress within an individual belt module is a result of drag friction between the modules and the track, which is exacerbated as the conveyor belt traverses curves in the underlying track.

This drag friction is preferably accounted for in the design of the conveyor belt modules to ensure that the resulting stresses will not be excessively detrimental to the general operation and useful life of each module. However, simply making an increasingly robust conveyor belt module compounds the issue—as the mass of each conveyor belt module increases, so does the associated drag friction.

In addition, this drag friction has an undesirable impact on the other components of the overall conveyor belt system. For instance, the increased load causes additional wear and tear on the drive motor and the related drive components (e.g., drive gears, drive sprockets, etc.), which can increase the operational and maintenance costs associated with the conveyor belt system.

Another common issue with conveyor belts is that the repetitive array of modules can cause difficulty during installation and operation. For instance, each conveyor belt module typically defines a drive pocket that is specifically designed and configured to be engaged by a drive sprocket of the drive system. Often, one or more modules is incorrectly or inadvertently offset laterally such that the drive pocket is not properly engaged with the appropriate drive sprocket. This misalignment can result in premature wear and damage to the individual conveyor belt modules as well as to the various drive components.

In light of at least the above challenges, a need exists for an improved conveyor belt module and track that reduces the overall impact of drag friction and a module that promotes proper engagement with drive components.

SUMMARY OF THE INVENTION

In one aspect, a conveyor belt module comprises a body that extends between a first plane and a second plane that is spaced apart from the first plane. A link end is formed in the body and has an opening along a hinge axis. A cover extends from the body in a direction of the hinge axis. A post extends from the cover along a post axis. A tab is engaged with the post and has a guide extending in the direction of the hinge axis. A bearing is rotatably engaged with the post. A fastener is engaged with the post to capture the bearing between the cover and the fastener. The bearing is housed at least partially between the first plane and the second plane.

In another aspect, a conveyor belt module comprises a body that extends between a first plane and a second plane that is spaced apart from the first plane. A link end is formed in the body and has an opening along a hinge axis. A cover extends from the body in a direction of the hinge axis. A post extends from the cover along a post axis. A bearing is rotatably engaged with the post. A fastener is engaged with the post to capture the bearing between the cover and the fastener. The hinge axis is oriented perpendicular to the post axis, and the bearing is housed at least partially between the first plane and the second plane.

In a further aspect, a conveyor belt module comprises a body that extends between an upper transport plane and a lower body plane that is spaced apart from the upper transport plane. A link end is formed in the body and has an opening along a hinge axis. A cover extends from the body in a direction of the hinge axis. A post extends from the cover transverse to the hinge axis. A tab engages with the post and has a guide extending in the direction of the hinge axis. A bearing is rotatably engaged with the post. A fastener is engaged with the post to capture the bearing between the cover and the fastener. The bearing is housed at least partially between the upper transport plane and the lower body plane.

In another aspect, a conveyor comprises a conveyor belt module including: a body extending between a first plane and a second plane that is spaced apart from the first plane; a link end formed in the body having an opening along a hinge axis; a cover extending from the body in a direction of the hinge axis; a post extending from the cover along a post axis; a bearing rotatably engaged with the post; a fastener engaged with the post to capture the bearing between the cover and the fastener; and a guide channel formed between the link end and the bearing. The bearing is housed at least partially between the first plane and the second plane. A track for supporting and guiding the conveyor belt module includes a guide arm that extends past the second plane toward the first plane of the body into the guide channel to engage the bearing.

In a further aspect, a conveyor belt module includes: a web extending in a lateral direction; a first link end extending from the web in a first direction that is transverse to the lateral direction and defining a drive pocket; a second link end extending from the web in a second direction that is opposite to the first direction; a first protrusion extending from the second link end in the first direction; and a second protrusion extending from the second link end in the second direction and offset in the lateral direction from the first protrusion. The first protrusion and the second protrusion are configured to inhibit driving engagement with a drive member.

In yet a further aspect, a conveyor belt module includes: a body; a first link end formed in the body having a first opening along a first hinge axis; a second link end formed in the body having a second opening along a second hinge axis; a hinge plane defined by the first hinge axis and the second hinge axis; a cover extending from the body in a direction of the first hinge axis and the second hinge axis; a post extending from the cover; a bearing rotatably engaged with the post; and a fastener engaged with the post to capture the bearing between the cover and the fastener. The hinge plane intersects the bearing.

These and still other aspects will be apparent from the description that follows. In the detailed description, preferred example embodiments will be described with reference to the accompanying drawings. These embodiments do not represent the full scope of the concept; rather the concept may be employed in other embodiments. Reference should therefore be made to the claims herein for interpreting the breadth of the invention.

DETAILED DESCRIPTION OF THE PREFERRED EXAMPLE EMBODIMENT

The concepts described below and shown in the accompanying figures are illustrative of several example implementations of the inventive concepts; however, when given the benefit of this disclosure, one skilled in the art will appreciate that the inventive concepts described herein can be modified and incorporated into many other applications. Furthermore, throughout the description terms such as front, back, side, top, bottom, up, down, upper, lower, inner, outer, above, below, and the like are used to describe the relative arrangement and/or operation of various components of the example embodiments; none of these relative terms are to be construed as limiting the construction or alternative arrangements that are within the scope of the claims.

Figure 1:
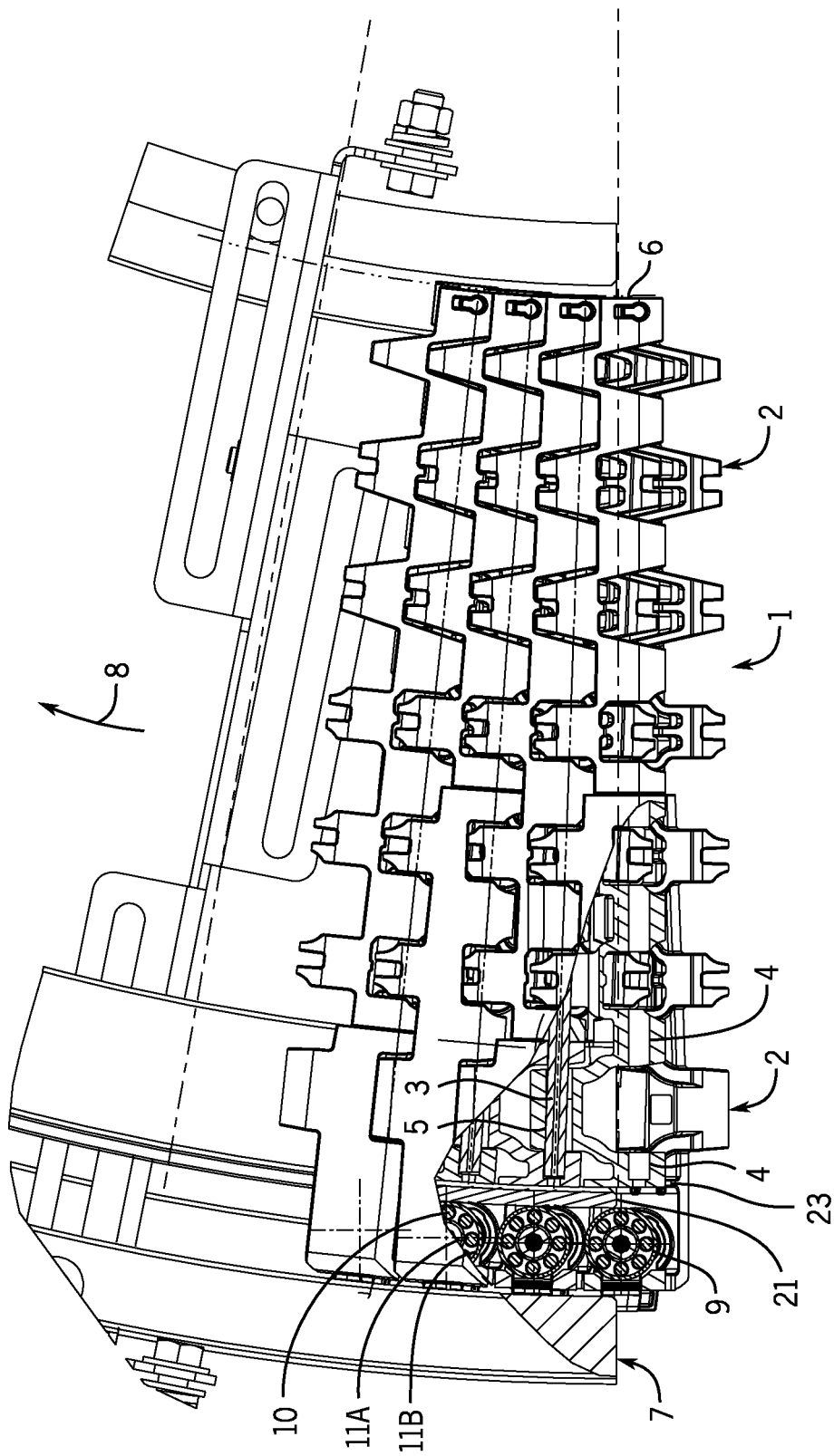
FIG. 1 is a top plan view of a first example module riding in an example track.

FIG. 1 illustrates an example conveyor 1 including multiple modules 2 that are pivotally coupled to adjacent modules 2 with respective hinge pins 3. The hinge pins 3 extend through and are partially captured by alternating cylindrical openings 4 and slotted openings 5, thus allowing the modules 2 to collapse along an inner edge 6 when traversing a lateral curve. With additional reference to FIGS. 2-6, the modules 2 are supported by, ride along, and are directed by a track 7 as the modules 2 move in a direction of travel 8 (shown in FIG. 1). Specifically, the modules 2 at the end of each row include a bearing 9 that is rotatably coupled to the module 2. The bearing 9 can be any type of bearing (e.g., roller bearing, needle bearing, etc.) that functions to reduce sliding friction, and is shown as a typical ball bearing having balls 10 captured between an inner race 11A and an outer race 11B. While only one bearing 9 is illustrated per row of modules 2, any number of bearings 9 may be incorporated and positioned along the module 2.

Figure 2:
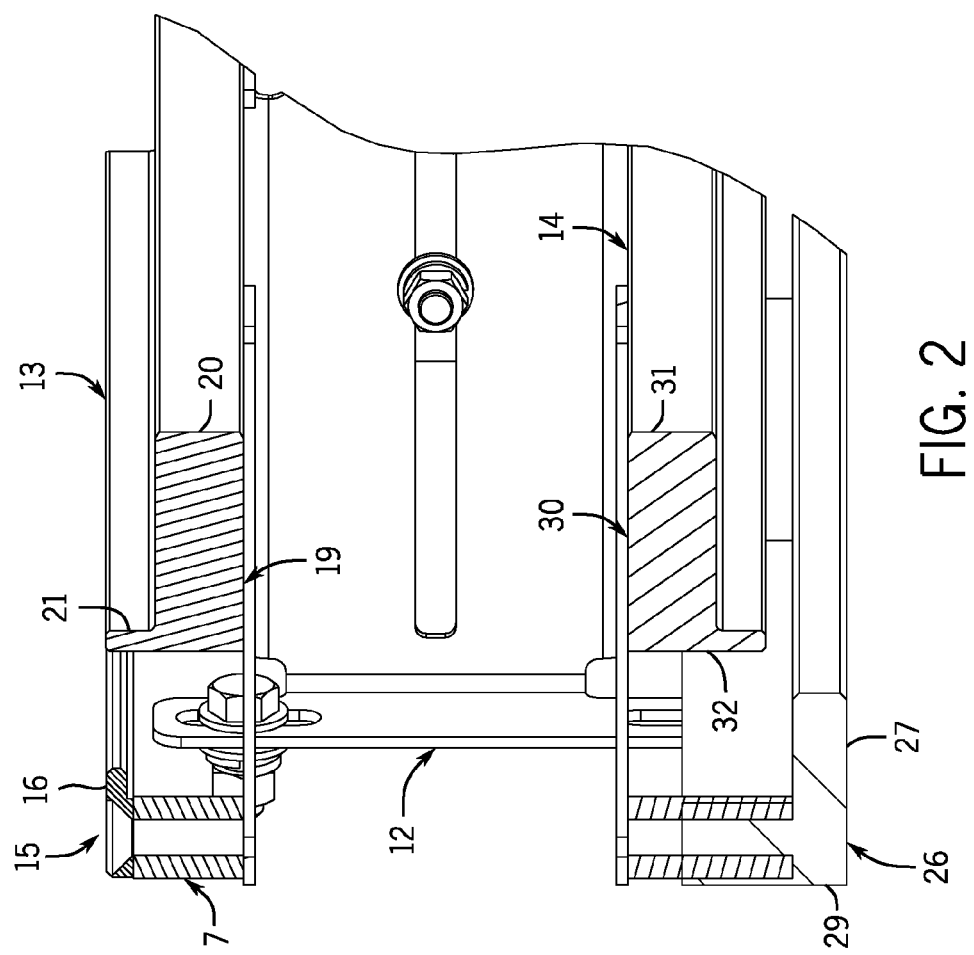
FIG. 2 is a detail section view of the example track shown in FIG. 1.
Figure 3:
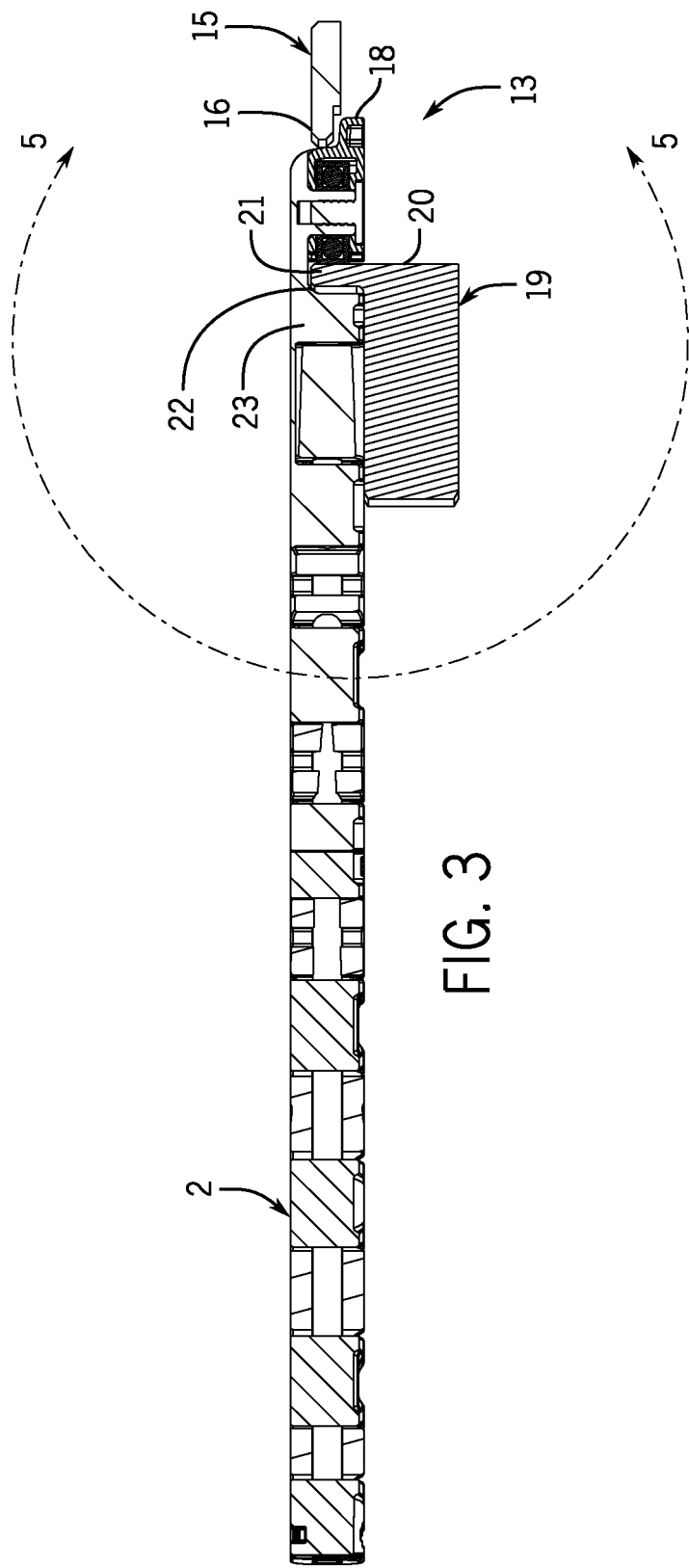
FIG. 3 is a partial section view of the first example module riding in the top of the example track.

FIG. 2 illustrates the example track 7 supported by a frame 12; the frame 12 supports and spaces apart an upper track 13 and a lower track 14. As further shown in FIGS. 3-6, the upper track 13 includes an outer portion 15 having an inwardly extending lip 16 that is configured to help capture the modules 2 to the track 7 during operation of the conveyor 1. Specifically, a tab 18 of the module 2 is captured beneath the lip 16. The upper track 13 also includes an inner portion 19 that supports the modules 2 on a horizontal base 20 and has a guide arm 21 that extends upward from the horizontal base 20. The guide arm 21 includes an arcuate section matching the curvature of the balance of the track 7.

Figure 5:
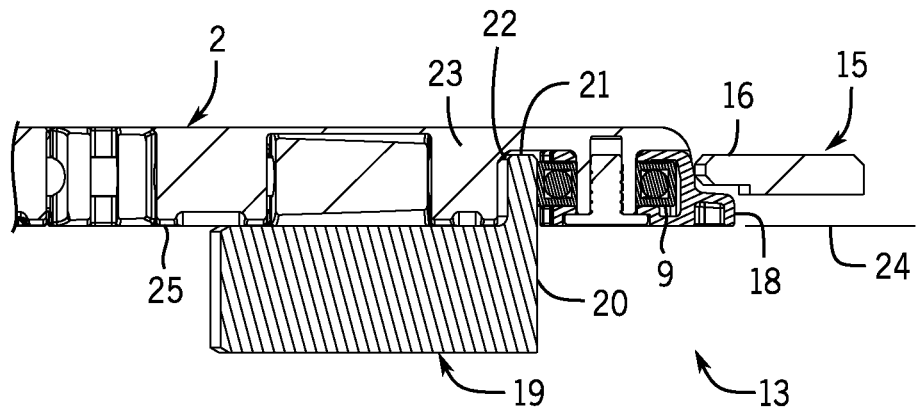
FIG. 5 is a detail section view of the portion of FIG. 3 circumscribed by arc 5-5.

As best illustrated in FIGS. 1 and 5, when the module 2 is installed in the track 7, the guide arm 21 extends upward into a guide channel 22 formed in the module 2, such that the guide arm 21 is positioned between a link end 23 and the bearing 9. The guide arm 21 extends upward through a lower plane 24 defined generally along the bottom surface 25 of the module 2 (shown in FIG. 5). As a result, the bearing 9 interfaces with the guide arm 21 as the module 2 moves along the track 7. This engagement aids in control of the modules 2 and reduces the drag friction that typically occurs due to the relative sliding movement of the track 7 and the module 2, especially as the modules 2 traverse curves in the track 7.

Figure 4:
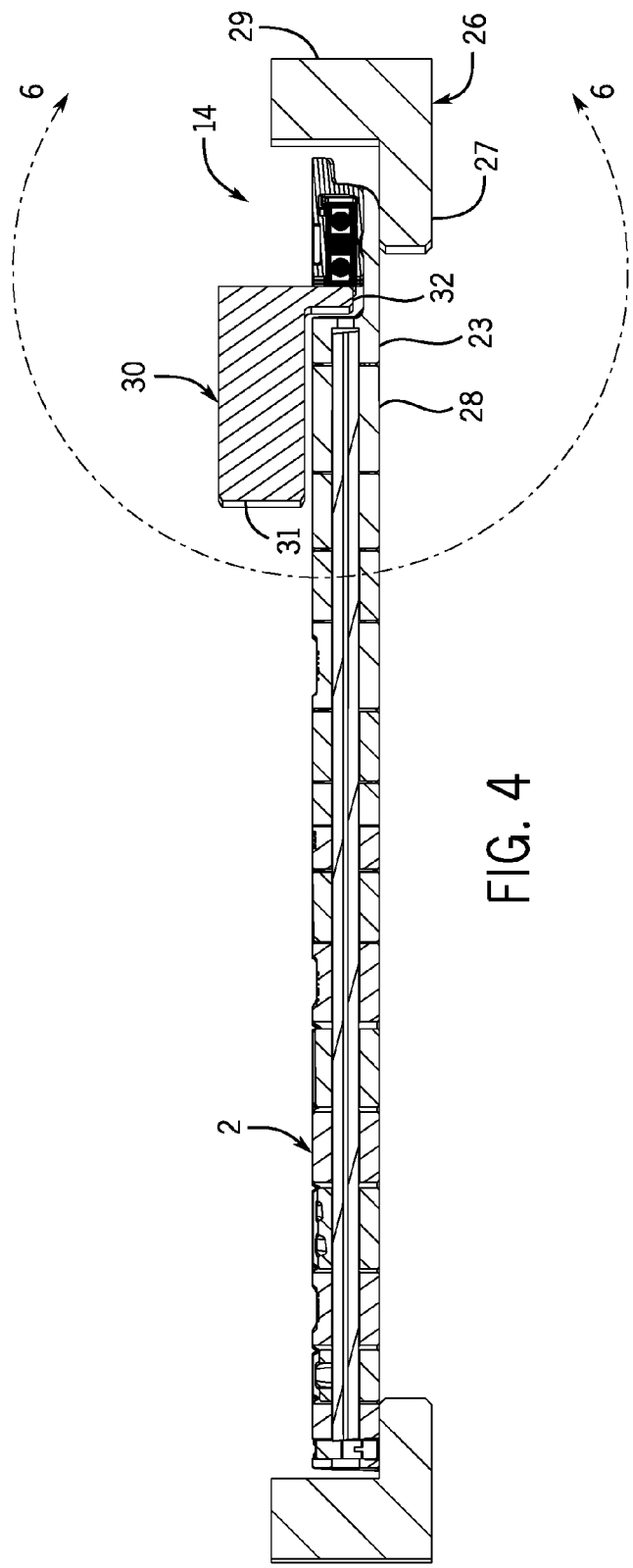
FIG. 4 is a partial section view of the first example module riding in the bottom of the example track.
Figure 6:
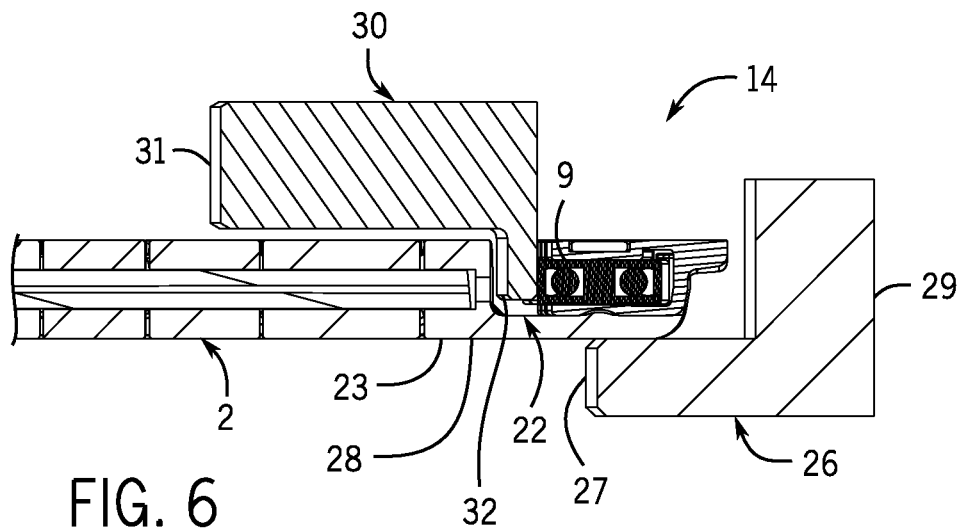
FIG. 6 is a detail section view of the portion of FIG. 4 circumscribed by arc 6-6.
Figure 7:
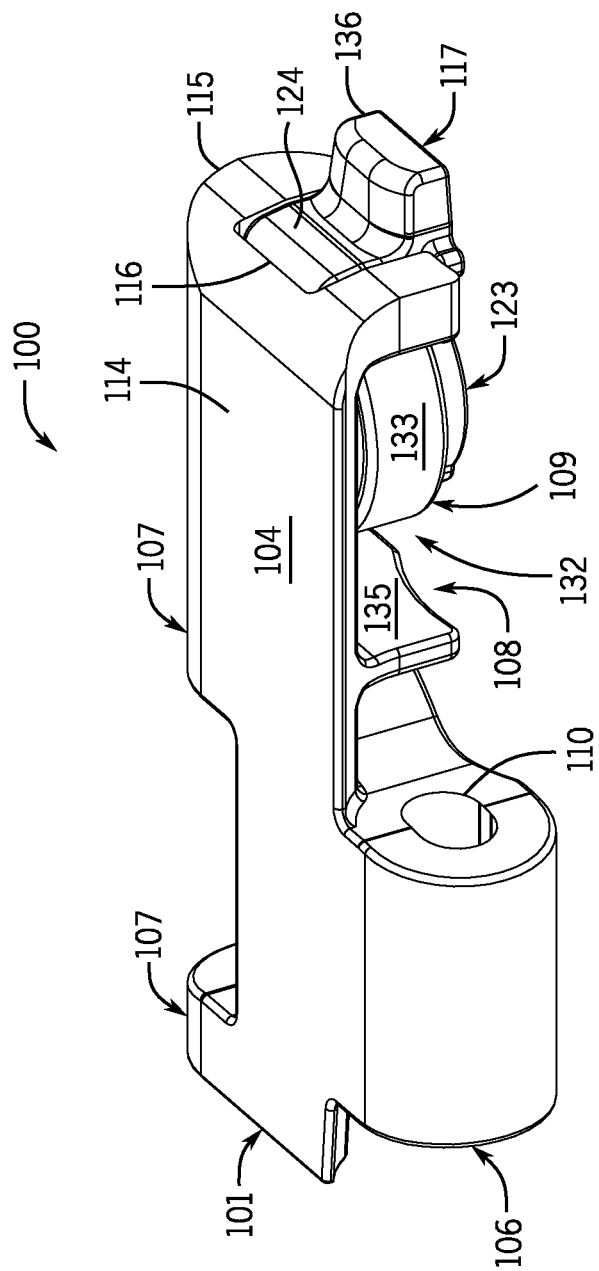
FIG. 7 is a top isometric view of the first example module.
Figure 8:
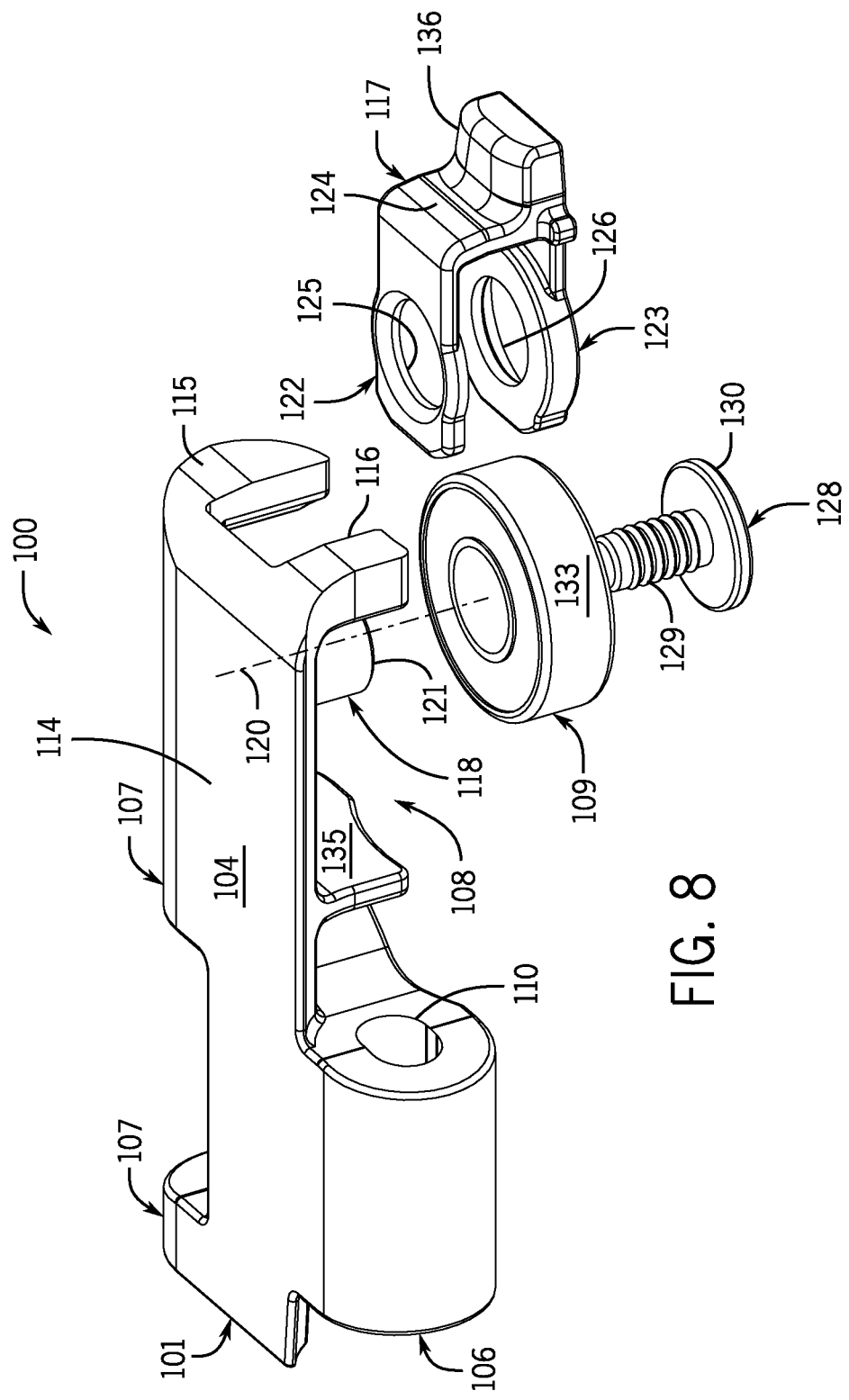
FIG. 8 is a top isometric exploded view of the first example module.
Figure 9:
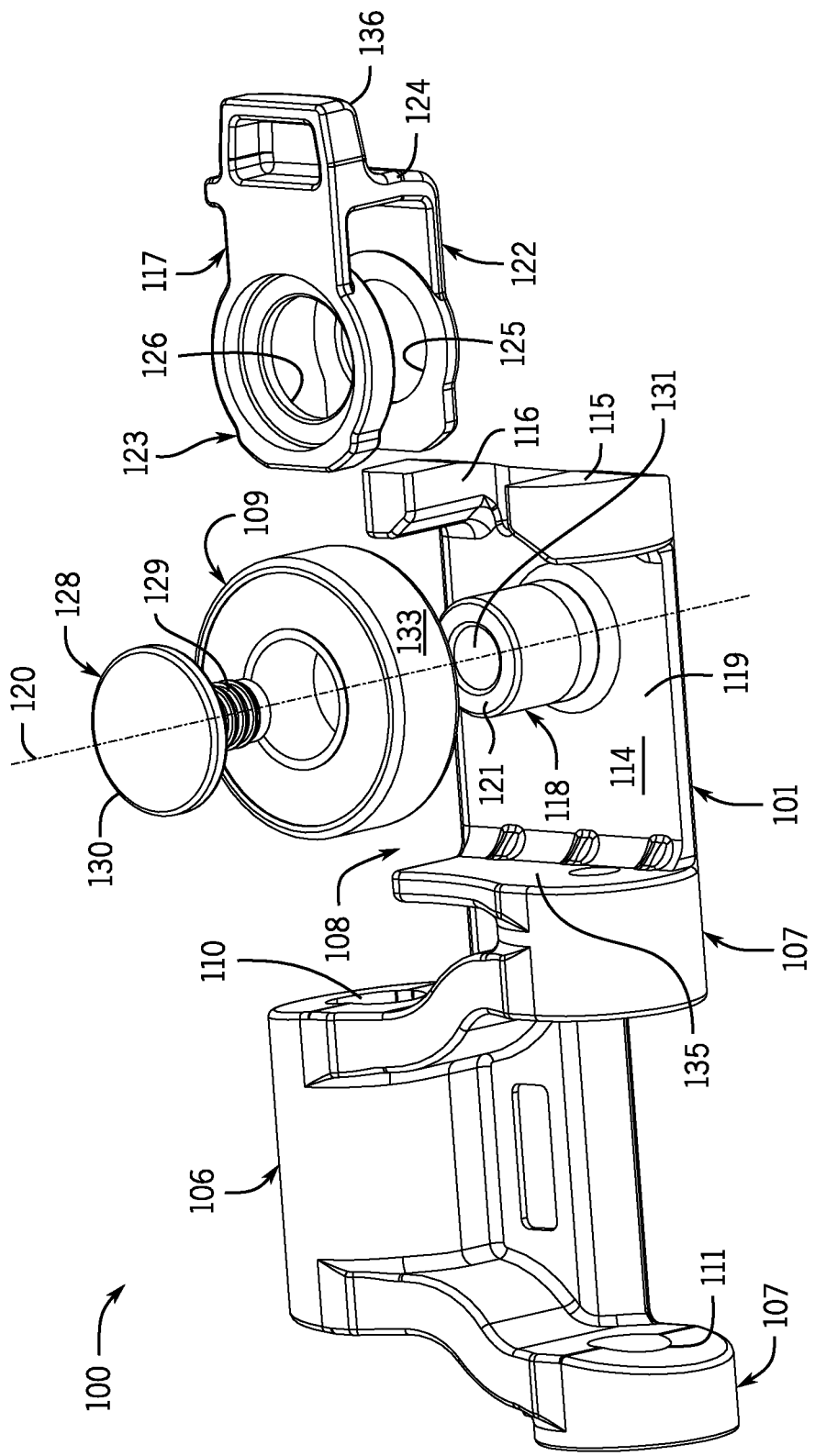
FIG. 9 is a bottom isometric exploded view of the first example module.

With specific reference to FIGS. 2, 4, and 6, the lower track 14 includes an outer portion 26 having an L-shaped cross section, with a horizontal leg 27 that engages a transport surface 28 of the module 2. The horizontal leg 27 supports the module 2 as it wraps around the conveyor 1. A vertical leg 29 of the outer portion 26 generally shields the side of the modules 2 during operation of the conveyor 1. An inner portion 30 has a horizontal base 31 and a guide arm 32 (similar to guide arm 21) that extends downward from the horizontal base 31. The guide arm 32 is also arcuate to match the curvature of the track 7.

As best illustrated in FIG. 6, the guide arm 32 extends downward into the guide channel 22 formed in the module 2, such that the guide arm 32 is positioned between the link end 23 and the bearing 9. As a result, the bearing 9 interfaces with the guide arm 32 as the module 2 moves along the track 7. And, as with the guide arm 21 of the upper track 13, this engagement aids in control of the modules 2 and reduces the drag friction that typically occurs due to the relative sliding movement of the track 7 and the module 2.

The track 7 can be made of plastic, metal, composite material, or any other suitable material having the desired friction and wear characteristics to meet the requirements of a particular application. Similarly, the module 2 can be made of plastic, metal, composite material, or any other suitable material meeting the specific application requirements.

A variety of conveyor belt modules can be configured to engage a track having some form of guide structure similar to that shown in FIG. 2. Four example embodiments are described below and with reference to the respective figures; however, one skilled in the art, given the benefit of this disclosure, will appreciate the various alternative constructions and combinations consistent with the overall inventive concepts.

FIGS. 7-14 illustrate a first example module 100. The module 100 generally has a body 101 that defines and extends between an upper transport plane 102 and a lower body plane 103 (best shown in FIGS. 10, 13, and 14). The upper transport plane 102 is generally coplanar with a transport surface 104 upon which articles or other module components (e.g., grippers) can be supported or attached. The lower body plane 103 is substantially coplanar (with planar surfaces) or tangential (with arcuate surfaces) with the lowermost surfaces 105 of the body, which are generally defined by the lower surfaces of opposing link ends 106, 107. As a result, the upper transport plane 102 is spaced apart from and generally parallel to the lower body plane 103, and defines a vertical envelope (i.e., the upper and lower bounds/extremes) of the module 100. In other forms, the upper transport plane 102 and the lower body plane 103 need not be substantially parallel, provided the body 101 defines a void 108 for receiving a bearing 109 such that the bearing 109 can be at least partially housed within the void 108, and hence partially within the outer envelope of the module 100.

Figure 10:
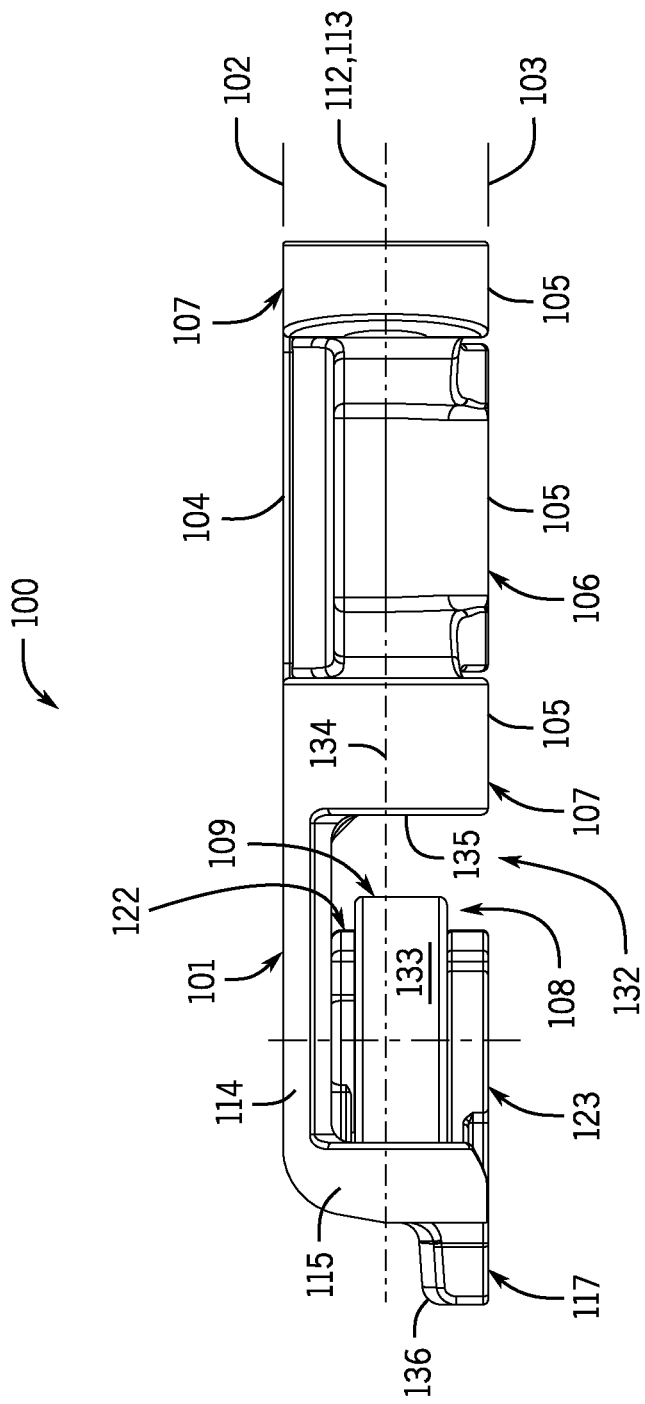
FIG. 10 is a front plan view of the first example module.
Figure 11:
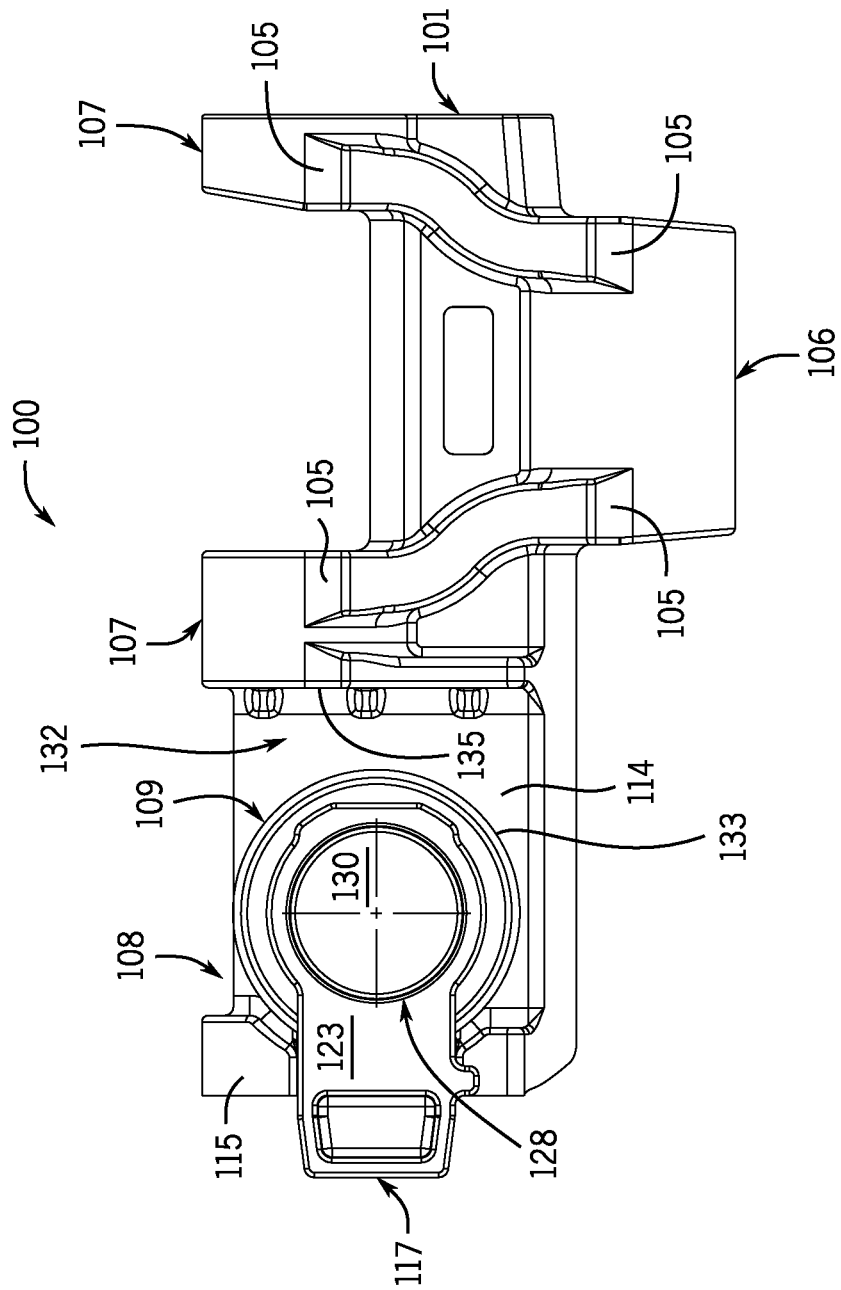
FIG. 11 is a bottom plan view of the first example module.
Figure 12:
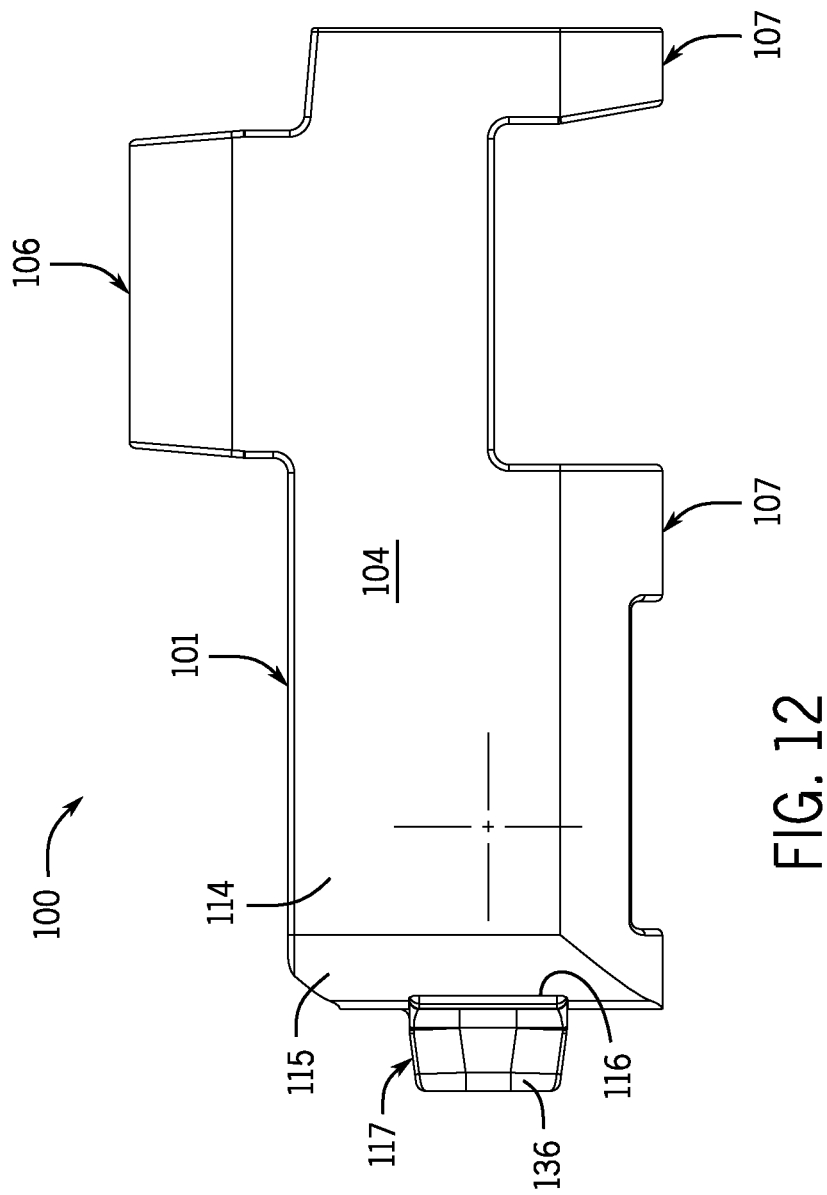
FIG. 12 is a top plan view of the first example module.
Figure 13:
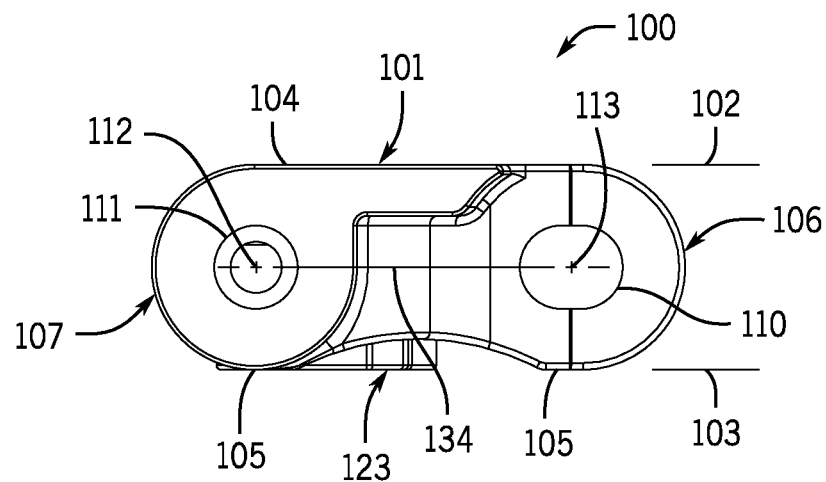
FIG. 13 is a right plan view of the first example module.
Figure 14:
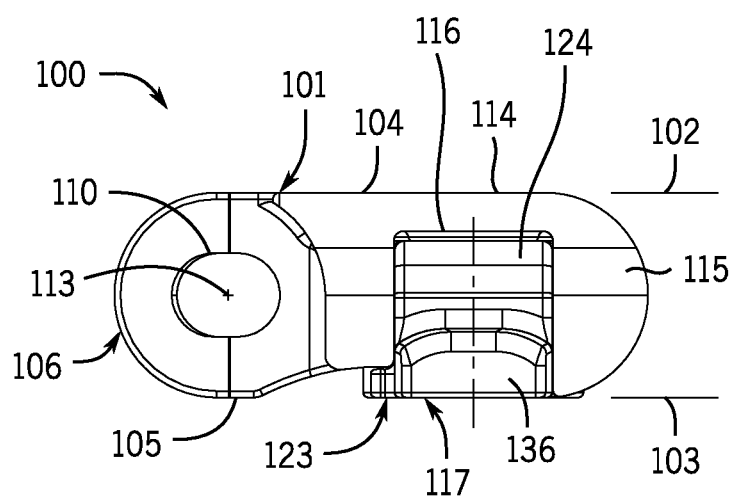
FIG. 14 is a left plan view of the first example module.
Figure 15:
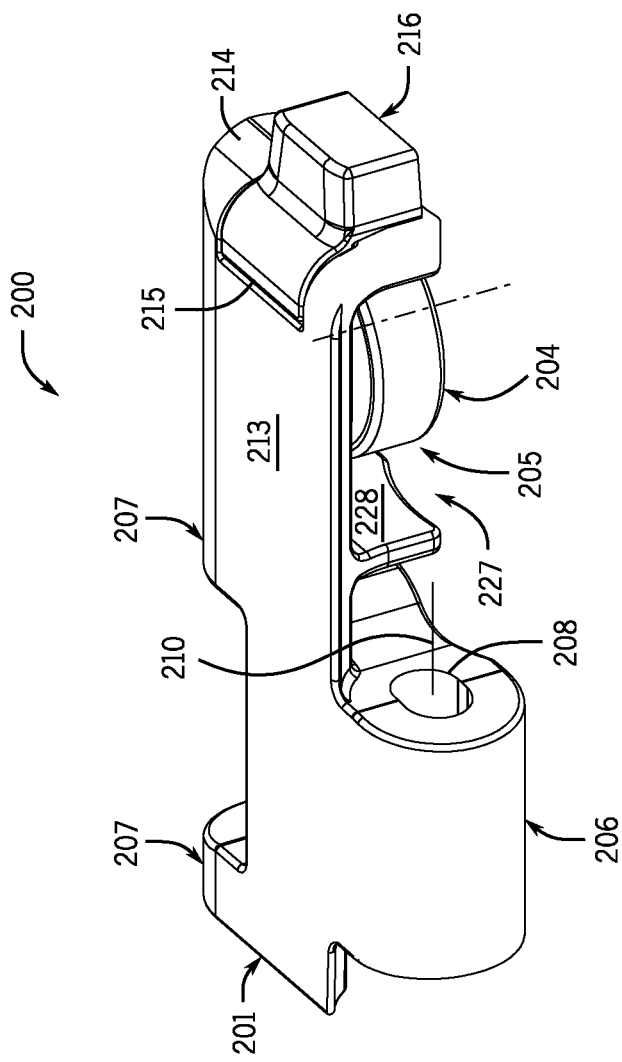
FIG. 15 is a top isometric view of a second example module.
Figure 16:
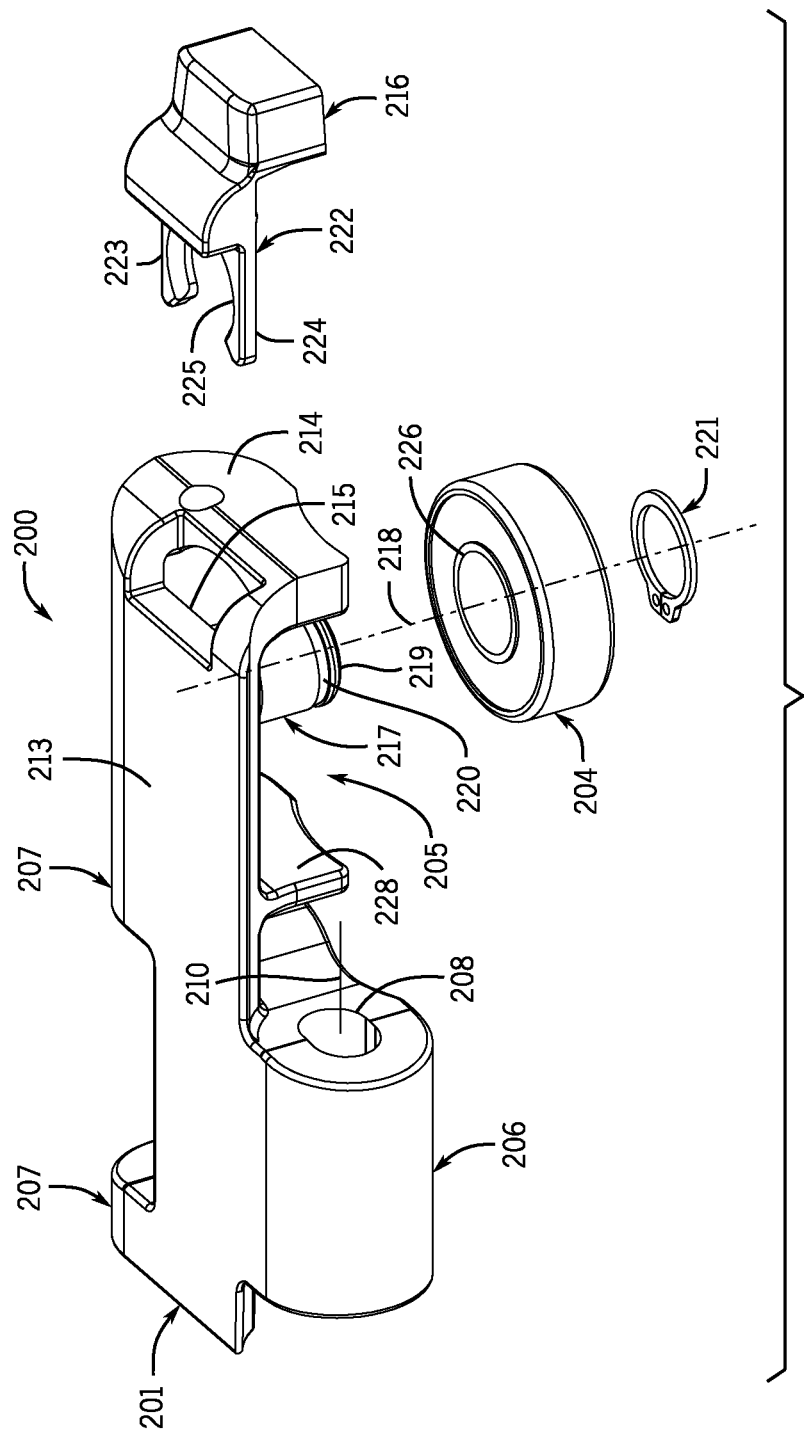
FIG. 16 is a top isometric exploded view of the second example module.
Figure 17:
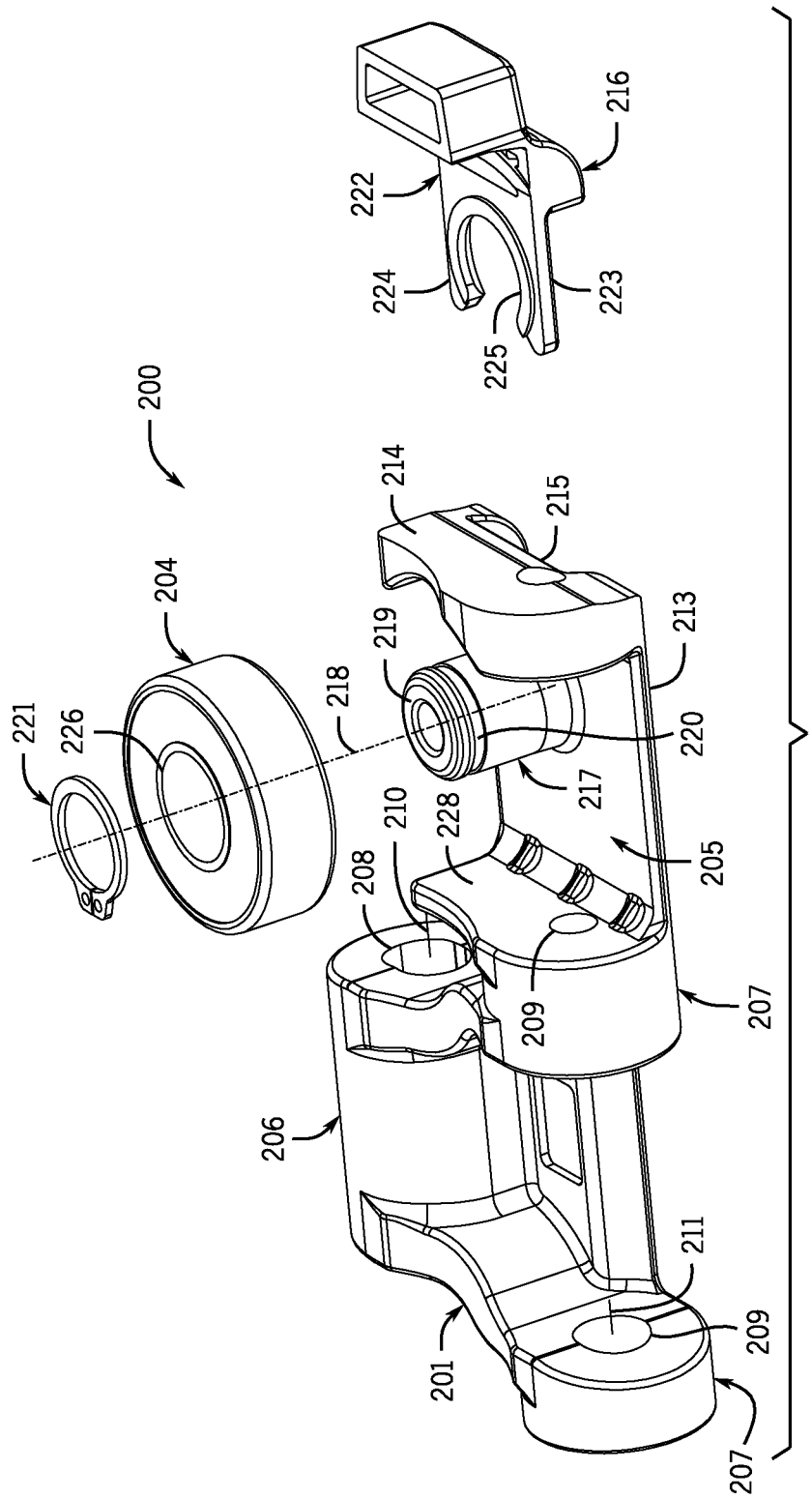
FIG. 17 is a bottom isometric exploded view of the second example module.

The body 101 defines the opposing link ends 106, 107. To accommodate side-flexing of the interconnected modules 100 (i.e., altering the center-to-center distance of successive hinge pins while traversing a curve), the link end 106 includes a slotted opening 110 allowing the hinge pin to be skewed within the slotted opening 110 (e.g., see hinge pin 3 in FIG. 1). The link ends 107 define a cylindrical opening 111 that is slightly larger than the outer diameter of a respective hinge pin. The cylindrical opening 111 defines a hinge axis 112, and the slotted opening 110 defines another hinge axis 113 that is generally defined along the geometric center of the slotted cross section. As best shown in FIG. 10, a plane 134 that is defined by the hinge axis 112 and the hinge axis 113 intersects the bearing 109 into two generally equivalent portions, with the lower portion being slightly greater than the upper portion. The positioning of the bearing 109 relative to the hinge axes 112, 113 helps to reduce forces and moments imparted to the bearing 109 and the underlying bearing 109 support structure during operation of the module 100 in a conveyor, especially as the module 100 traverses through a curved section of track. In other forms, a bearing is positioned in a body such that a plane defined by hinge axes intersects the bearing, regardless of any defined "void."

A cover 114 extends generally from the body 101 in the direction of the hinge axes 112, 113 and establishes bounds of the example void 108 that houses the bearing 109. The cover 114 also defines a downturned end wall 115 having a notched opening 116 that is configured to receive a tab 117, that is, a portion of the tab 117 can extend through the notched opening 116 into the void 108. With specific reference to FIGS. 8 and 9, the example module 100 includes a post 118 having a generally cylindrical form factor that is formed integral with the cover 114. The post 118 extends from an underside 119 of the cover 114 along a post axis 120 to a tip 121. In the example module 100, the post 118 is oriented substantially perpendicular to the underside 119 of the cover 114 and generally transverse to the hinge axes 112, 113. In other forms, the relative orientation between the post 118 and the cover 114 may be skewed.

The tab 117 of the example module 100 is configured to both engage the bearing 109 and the post 118. To that end, the tab 117 includes an upper arm 122 and a lower arm 123 that are connected by an intermediate bridge portion 124. The upper arm 122 defines an upper opening 125 and the lower arm 123 similarly defines a lower opening 126; the upper opening 125 and the lower opening 126 are coaxial and are sized to receive the post 118.

Before the tab 117 is slid over the post 118, the bearing 109 is inserted between the upper arm 122 and the lower arm 123, thus sandwiching the bearing 109. With a central opening 127 of the bearing 109 positioned coaxial with the upper opening 125 and the lower opening 126, the bearing 109 and the tab 117 are engaged with (i.e., slid onto) the post 118. When assembled, the tab 117 (e.g., the thickness of the upper arm 122 and the lower arm 123) helps position the bearing 109 relative to the balance of the module 100 to orient the bearing 109 in a desired location (e.g., such that the plane 134 intersects the bearing 109) to reduce excessive stresses on both the bearing 109 and the supporting post 118.

To axially restrain the bearing 109 on the post 118 between the arms 122, 123 of the tab 117 (and to secure the tab 117 to the post 118), a fastener 128 is engaged with the post 118 to capture the bearing 109 between the cover 114 and the fastener 128. The example fastener 128 includes a barbed shank portion 129 that extends from an enlarged flange portion 130. The barbed shank portion 129 includes surface contours that axially interlock with a cooperating structure in a receptacle 131 (e.g., a generally cylindrical cavity with axially spaced, annular ribs shown in FIG. 5) formed in the post 118 (best shown in FIG. 9), which inhibits translation of the fastener 128 along the post axis 120. Inserting the barbed shank portion 129 into the receptacle 131 results in the enlarged flange portion 130 abutting the lower arm 123 of the tab 117, and thus capturing the tab 117 and the bearing 109 to the post 118.

With specific reference to FIG. 10, when the bearing 109 is installed in the balance of the module 100, a guide channel 132 is established between a side face 135 of the link end 107 and a cylindrical engagement surface 133 of the bearing 109. As a result, the bearing 109 interfaces with a guide arm as the module 100 moves along the track (e.g., as shown with reference to FIG. 1). In one form, the cylindrical engagement surface 133 rolls against a tangentially oriented guide surface defined by the guide arm of the track. This engagement aids in control of the modules 100 and reduces the drag friction that typically occurs due to the relative sliding movement of the track and the module 100. The tab 117 further includes a guide 136 that extends from the bridge portion 124 in the direction of the hinge axes 112, 113. The guide 136 is configured to be partially captured by a cooperating track, similar to the tab 18 shown best in FIG. 5.

The bearing 109 in the example module 100 is completely housed between the upper transport plane 102 and the lower body plane 103 defined by the body 101. While the bearing 109 need not be completely housed between the planes 102, 103, in some constructions, at least partially positioning the bearing 109 between the upper transport plane 102 and the lower body plane 103 allows the plane 134 (illustrated as a line in FIGS. 10 and 13), which is defined by the hinge axis 112 and the hinge axis 113 (and generally parallel to the planes 102, 103 in the example module 100), to intersect the bearing 109 defining two portions, which are preferably generally equivalent halves. Furthermore, in the example embodiment, the bearing 109 is also completely beneath the cover 114 (as viewed in FIG. 12), but may extend beyond the cover 114 in other embodiments.

Three additional example modules are described below, with emphasis being given to noting the differences from the first example module 100 described above.

FIGS. 15-19 illustrate a second example module 200. The module 200 has a body 201 that defines and extends between an upper plane 202 and a lower plane 203. The upper plane 202 is spaced apart from the lower plane 203 to define a thickness of the module 200 between which a bearing 204 is (at least partially) housed. Specifically, in the example embodiment, the bearing 204 is completely housed within the thickness of the module 200 in a void 205 defined by the body 201.

Figure 18:
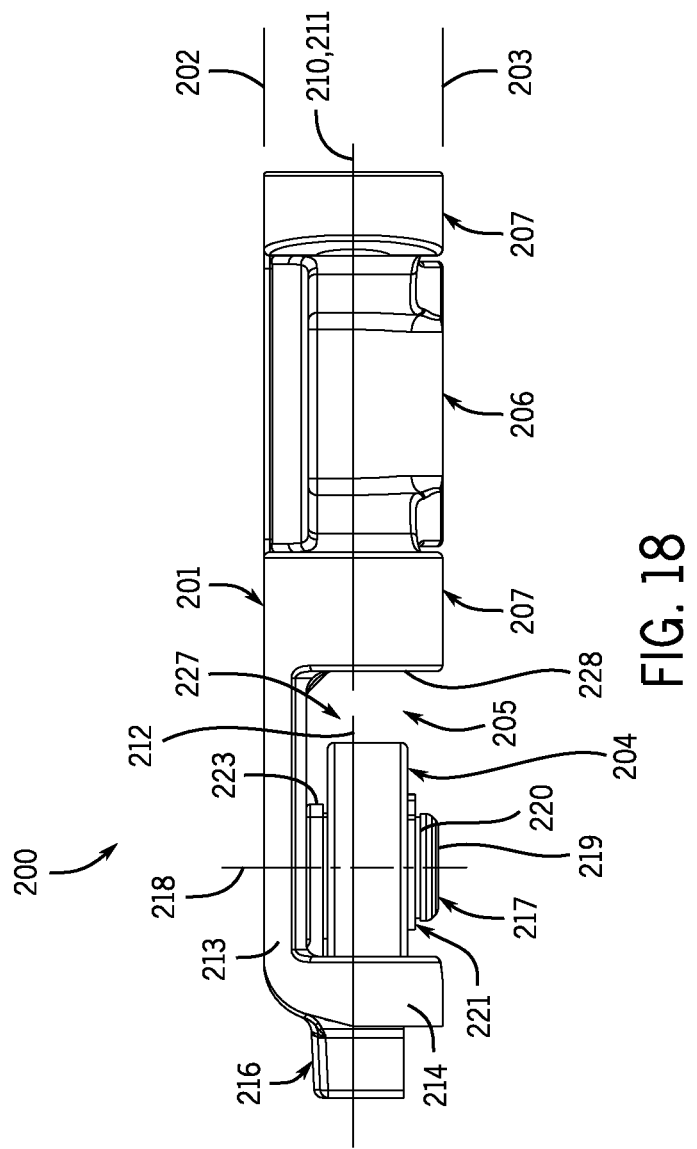
FIG. 18 is a front plan view of the second example module.
Figure 19:
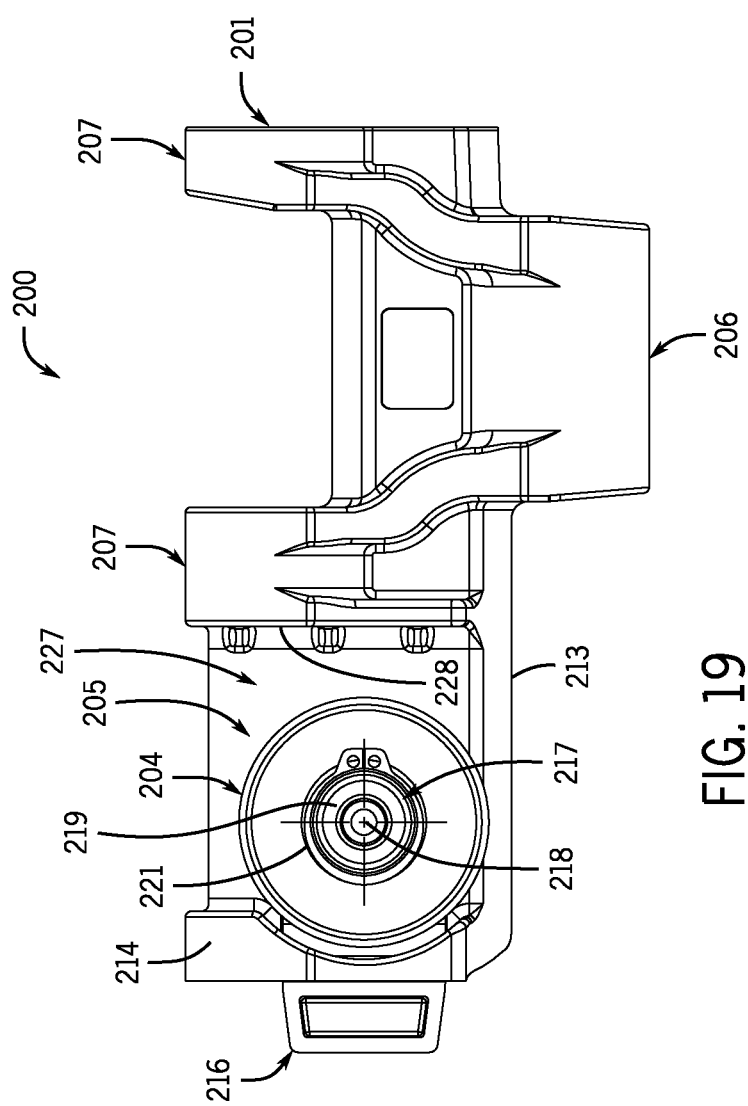
FIG. 19 is a bottom plan view of the second example module.
Figure 20:
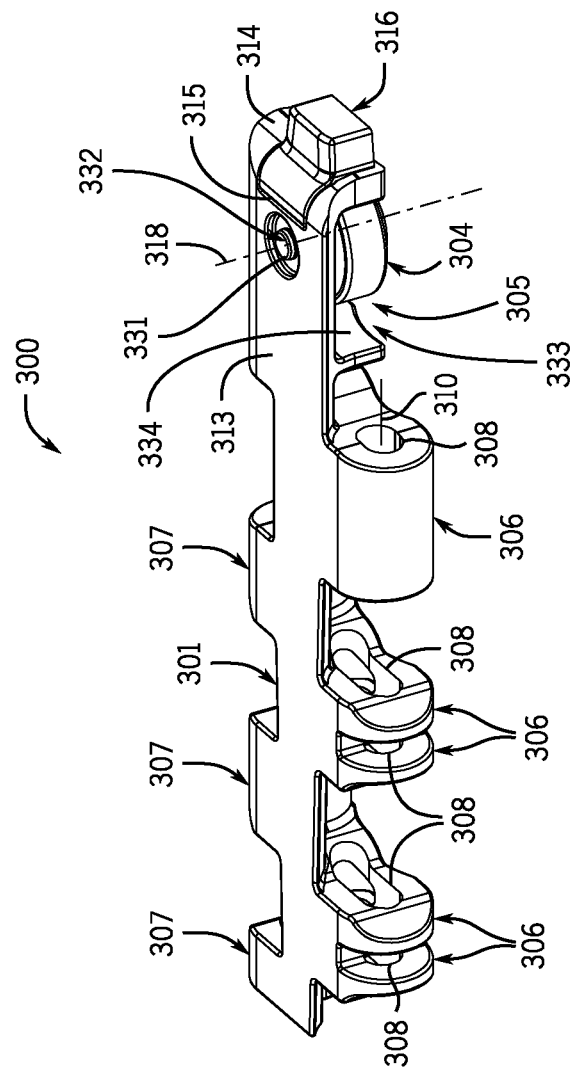
FIG. 20 is a top isometric view of a third example module.
Figure 21:
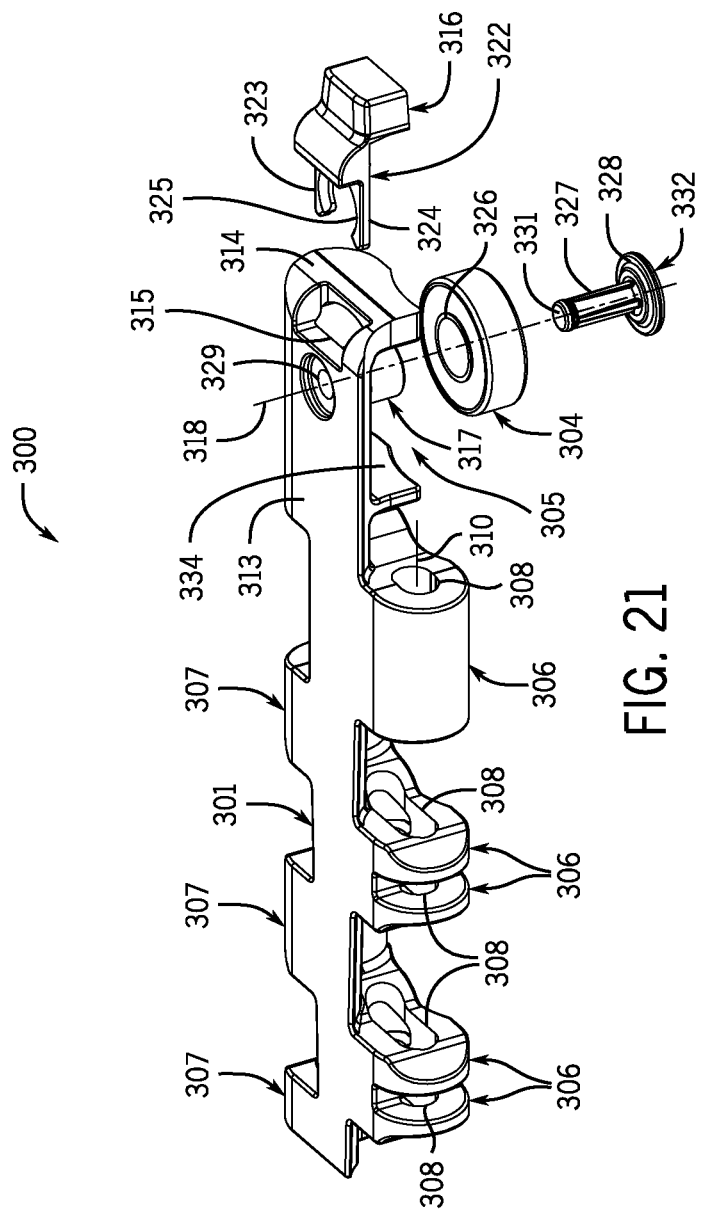
FIG. 21 is a top isometric exploded view of the third example module.
Figure 22:
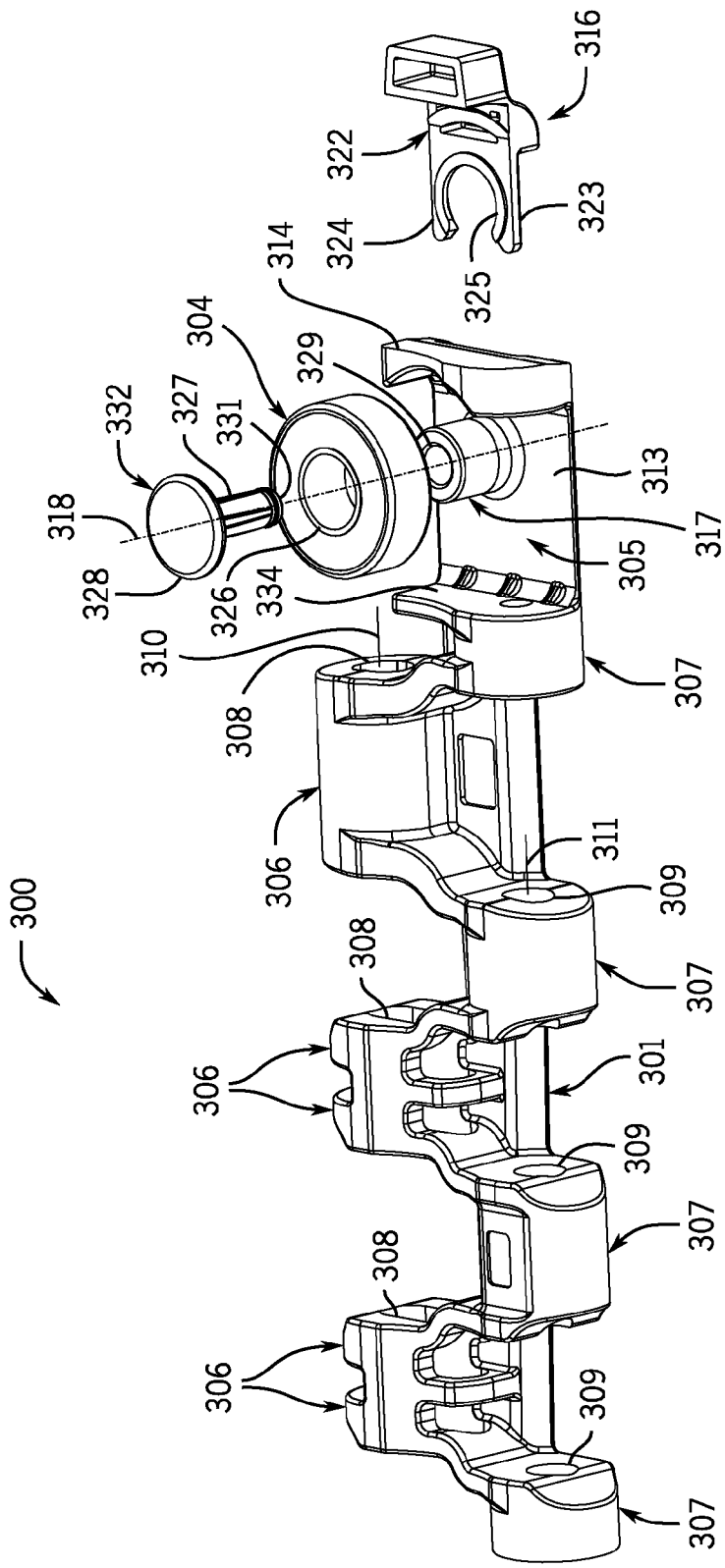
FIG. 22 is a bottom isometric exploded view of the third example module.

The body 201 includes opposing link ends 206, 207 with respective openings 208, 209 for receiving mating hinge pins during operation. Each opening 208, 209 further defines a respective hinge axis 210, 211, and a plane 212 is then established by the hinge axes 210, 211. As best shown in FIG. 18, the plane 212 intersects the bearing 204 to define two portions. Again, the location of the bearing 204 relative to the hinge axes 210, 211 reduces the forces and moments imparted to the bearing 204 and the underlying support structure during operation of the module 200 in a conveyor, especially as the module 200 traverses through a curved section of track.

A cover 213 extends from the body 201 and establishes bounds of the example void 205 that houses the bearing 204. The cover 213 also defines a downturned end wall 214 having an opening 215 that is configured to receive a tab 216, that is, a portion of the tab 216 can extend through the opening 215 into the void 205. With specific reference to FIGS. 16 and 17, the example module 200 includes a post 217 having a generally cylindrical form factor that is integral with the cover 213, and that extends from the cover 213 along a post axis 218 to a tip 219. The post 217 includes an annular groove 220 near the tip 219 that is sized to receive a fastener in the form of a retaining ring 221, which when seated in the annular groove 220 captures the bearing 204 to the post 217 to inhibit the bearing 204 from moving along the post axis 218.

The tab 216 of the example module 200 is configured to both engage the bearing 204 and the post 217. To that end, and with specific reference to FIGS. 16-18, the tab 216 includes an arm 222 having opposing resilient fingers 223, 224 that can be secured to the post 217. Specifically, the resilient fingers 223, 224 define a generally circular C-shaped opening 225 that is sized to engage the outer diameter of the post 217. The resilient fingers 223, 224 are inserted through the opening 215 in the end wall 214 and flex to allow the post 217 to seat into the opening 225. With the tab 216 secured to the post 217, a central opening 226 of the bearing 204 is aligned and slid over the post 217. As noted above, the retaining ring 221 is then seated in the annular groove 220 to capture the bearing 204 to the post 217. When assembled, the tab 216 (e.g., the thickness of the arm 222) helps position the bearing 204 within the module 200 to orient the bearing 204 in a desired location to reduce excessive stresses on both the bearing 204 and the supporting post 217 (best shown in FIG. 18).

With specific reference to FIG. 18, when the bearing 204 is installed in the balance of the module 200, a guide channel 227 is established between a side face 228 of the link end 207 and the bearing 204. As a result, the bearing 204 interfaces with a guide arm as the module 200 moves along the track (e.g., as shown with reference to FIG. 1). This engagement aids in control of the modules 200 and reduces the drag friction that typically occurs due to the relative sliding movement of the track and the module 200. The bearing 204 in the example module 200 is also completely housed between the upper plane 202 and the lower plane 203, and is also completely within the void 205 (e.g., the bearing 204 is shown completely beneath the cover 213 in FIG. 19). While the bearing 204 need not be completely housed between the planes 202, 203, in some forms, at least partially positioning the bearing 204 between the upper plane 202 and the lower plane 203 allows the plane 212 (illustrated as a line in FIG. 18) defined by the hinge axis 210 and the hinge axis 211 to intersect the bearing 204, which reduces operating stresses on the bearing 204.

FIGS. 20-24 illustrate a third example module 300. The module 300 has a body 301 that defines and extends between an upper plane 302 and a lower plane 303 (shown in FIG. 23). The upper plane 302 is spaced apart from the lower plane 303 to establish an envelope between which a bearing 304 is housed. Specifically, as viewed in FIG. 23, the bearing 304 is completely housed within the thickness of the module 300 in a void 305 defined by the body 301.

Figure 23:
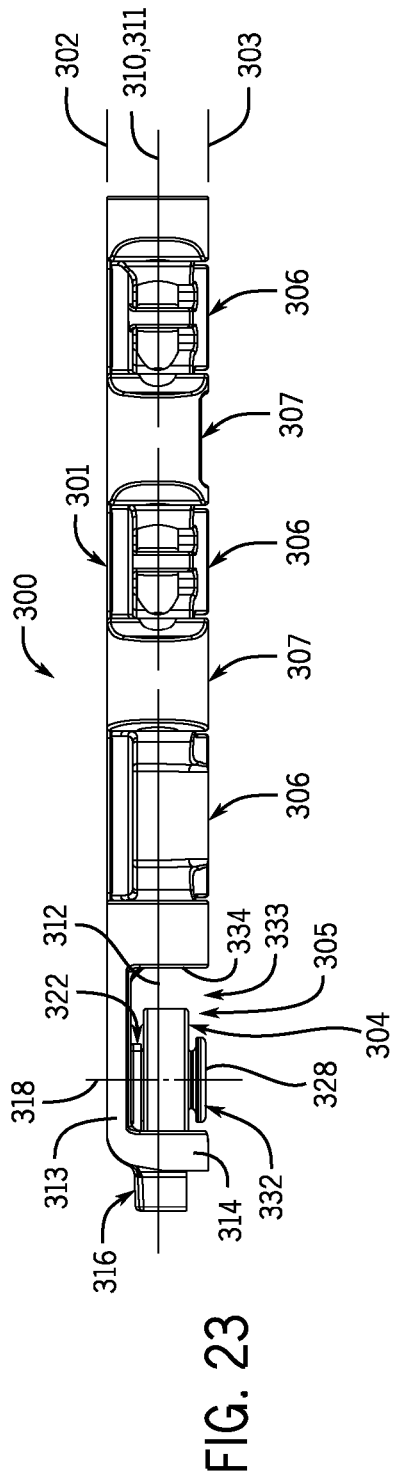
FIG. 23 is a front plan view of the third example module.
Figure 24:
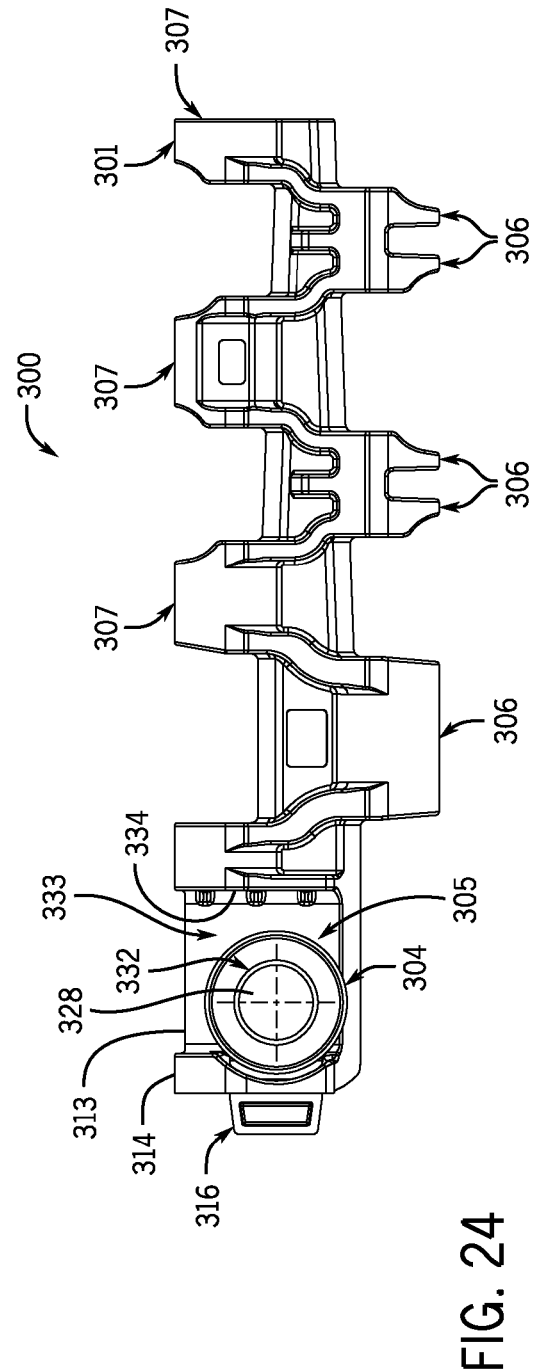
FIG. 24 is a bottom plan view of the third example module.
Figure 25:
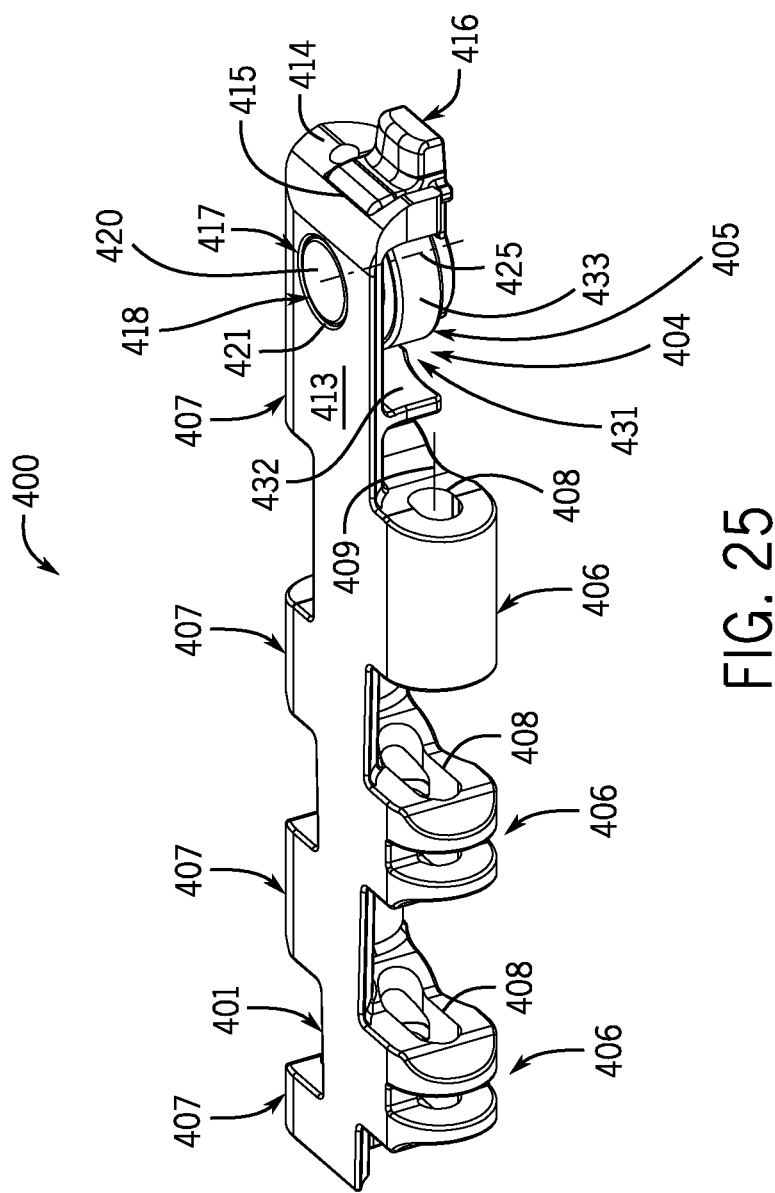
FIG. 25 is a top isometric view of a fourth example module.
Figure 26:
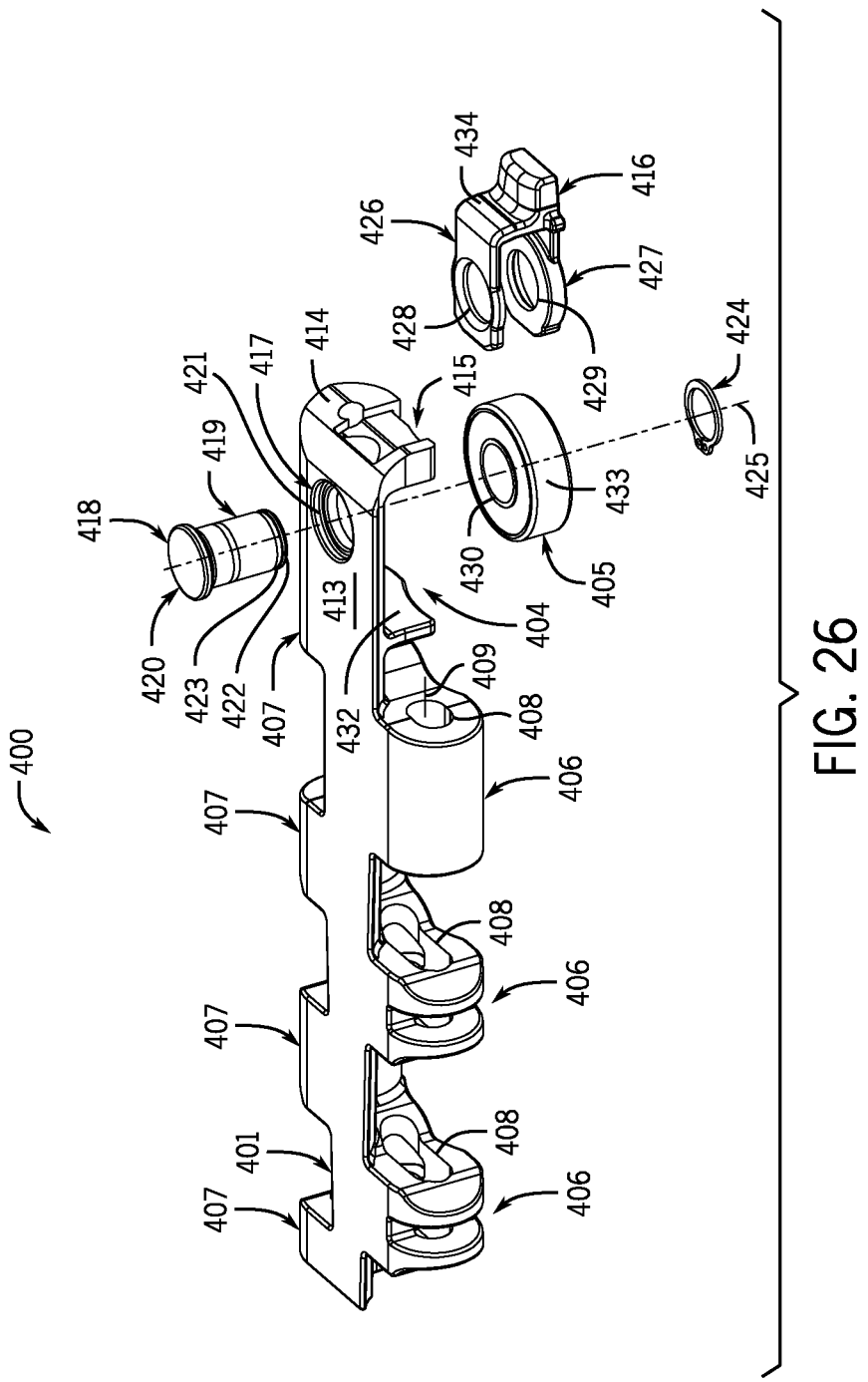
FIG. 26 is a top isometric exploded view of the fourth example module.
Figure 27:
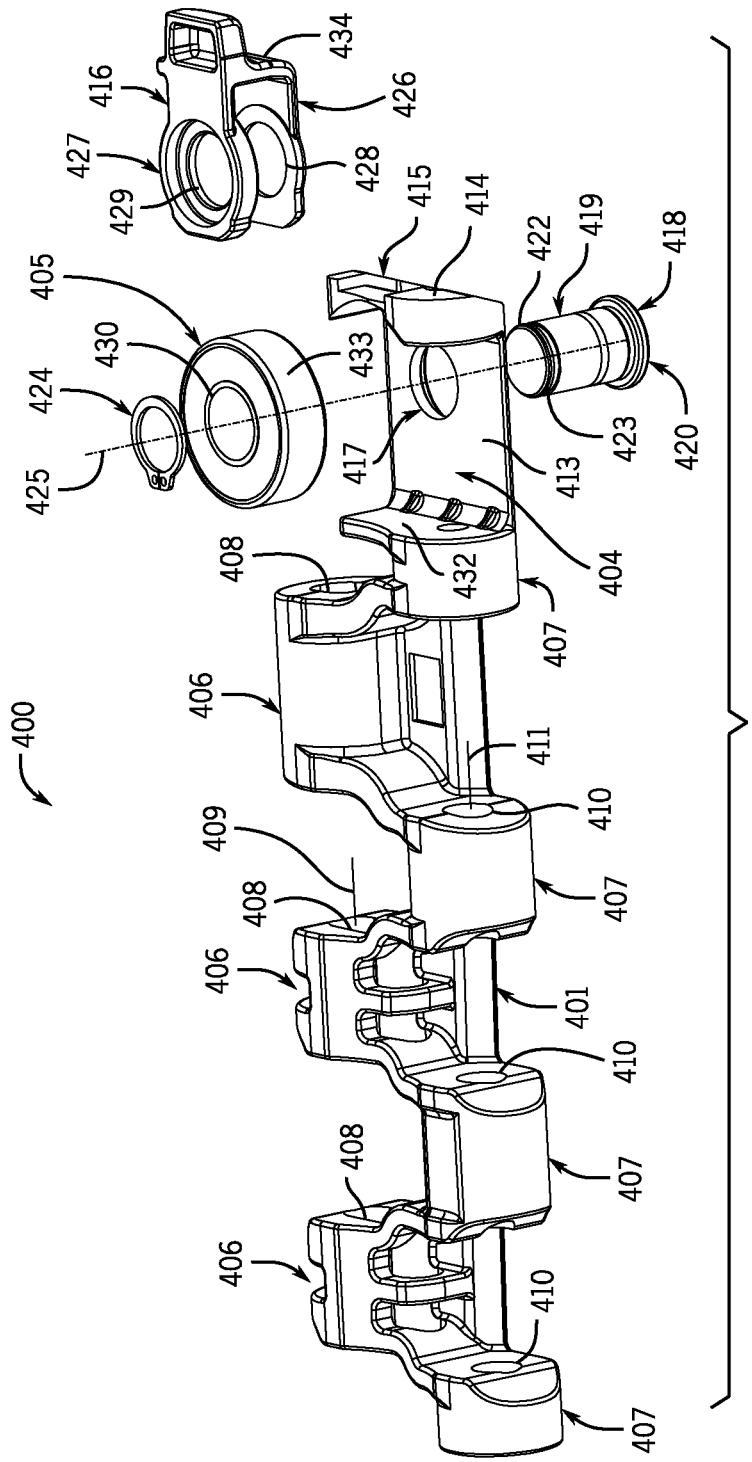
FIG. 27 is a bottom isometric exploded view of the fourth example module.

The body 301 includes opposing link ends 306, 307 with respective openings 308, 309 for receiving mating hinge pins during operation; each opening 308, 309 further defines a respective hinge axis 310, 311. A plane 312 is defined by the hinge axes 310, 311 such that both hinge axes 310, 311 are substantially on the plane 312. As best shown in FIG. 23, the plane 312 intersects the bearing 304, defining a lower portion that is greater than an upper portion. In some forms, the lower portion is about equal to the upper portion. Again, the location of the bearing 304 relative to the hinge axes 310, 311 reduces the forces and moments imparted to the bearing 304 and the support structure during operation of the module 300.

A cover 313 extends from the body 301 and establishes bounds of the void 305 that houses the bearing 304. The cover 313 also defines a downturned end wall 314 having an opening 315 that is configured to receive a tab 316, that is, a portion of the tab 316 can extend through the opening 315 into the void 305. With specific reference to FIGS. 21 and 22, the example module 300 includes a post 317 having a generally cylindrical form factor that is integral with the cover 313, and that extends from the cover 313 along a post axis 318. As with the other embodiments, the post 317 is sized to receive the bearing 304.

The tab 316 of the example module 300 is configured to both engage the bearing 304 and the post 317. With specific reference to FIGS. 21-23, the tab 316 includes an arm 322 having opposing resilient fingers 323, 324 that can be secured to the post 317. The resilient fingers 323, 324 define a generally circular C-shaped opening 325 that is sized to engage the outer diameter of the post 317. The resilient fingers 323, 324 are inserted through the opening 315 in the end wall 314 and flex to allow the post 317 to seat into the opening 325. A central opening 326 of the bearing 304 is aligned and slid over the post 317. When assembled, the tab 316 (e.g., the thickness of the arm 322) helps position the bearing 304 within the module 300 to orient the bearing 304 in a desired location to reduce excessive stresses on both the bearing 304 and the supporting post 317 (best shown in FIG. 23).

To axially restrain the bearing 304 on the post 317, a fastener in the form of a rivet 332 is engaged with the post 317 to capture the bearing 304 between the cover 313 and the rivet 332. The example rivet 332 includes a shank portion 327 that extends from an enlarged flange portion 328. An opening 329 is formed through the post 317 (best shown in FIGS. 21 and 22) and is sized to receive the shank portion 327 of the rivet 332. The enlarged flange portion 328 supports the bearing 304 when assembled to the balance of the module 300. Specifically, inserting the shank portion 327 into the opening 329 engages the enlarged flange portion 328 with the bearing 304. A tip 331 of the shank portion 327 extends from the opening 329 near the cover 313 where it is deformed to capture the rivet 332 to the cover 313, thus inhibiting translation of the rivet 332 along the post axis 318 and capturing the bearing 304 to the post 317.

With specific reference to FIG. 23, when the bearing 304 is installed within the balance of the module 300, a guide channel 333 is established between a side face 334 of the link end 307 and the bearing 304. As with the other embodiments, the bearing 304 interfaces with a guide arm as the module 300 moves along the track (e.g., as shown with reference to FIG. 1). This engagement aids in control of the modules 300 and reduces the drag friction that typically occurs due to the relative sliding movement of the track and the module 300. The bearing 304 in the example module 300 is also completely housed between the upper plane 302 and the lower plane 303, and is also completely within the void 305 (e.g., the bearing 304 is shown completely beneath the cover 313 in FIG. 24). While the bearing 304 need not be completely housed between the planes 302, 303 (or completely beneath the cover 313), at least partially positioning the bearing 304 between the planes 302, 303 allows the plane 312 (illustrated as a line in FIG. 23) to intersect the bearing 304, which can ultimately reduce stress on the post 317.

FIGS. 25-29 illustrate a fourth example module 400. The module 400 has a body 401 that is bounded vertically (with reference to FIG. 28) between an upper plane 402 and a lower plane 403, which is spaced apart from and generally parallel to the upper plane 402. The body 401 defines a void 404 for receiving a bearing 405, such that the bearing 405 can be at least partially housed within the void 404, and as shown, not extend downward beyond the lower plane 403.

Figure 28:
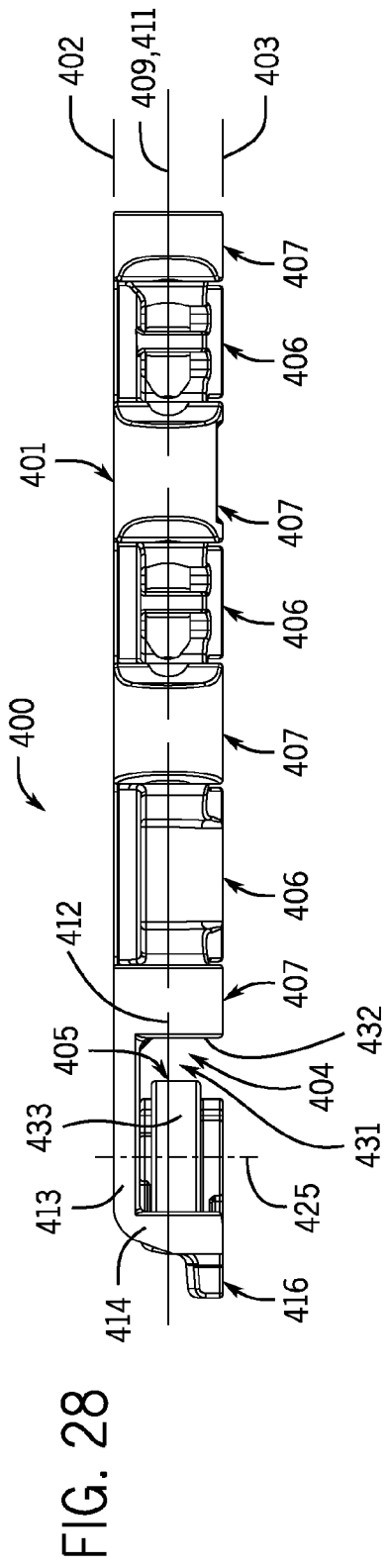
FIG. 28 is a front plan view of the fourth example module.
Figure 29:
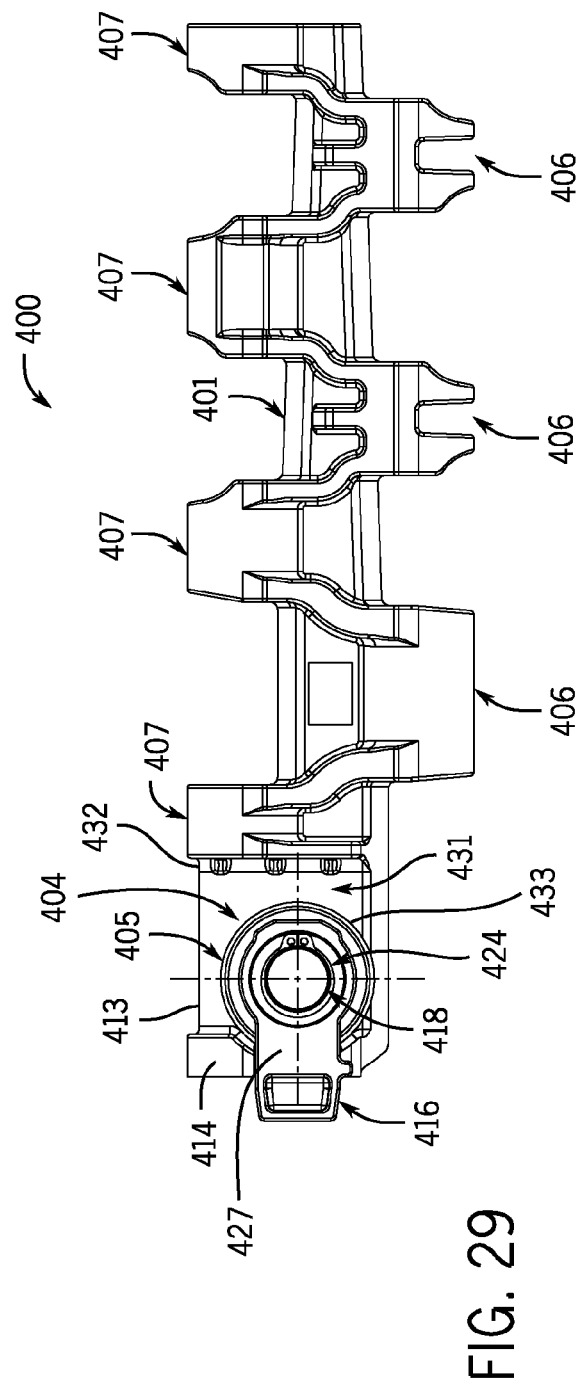
FIG. 29 is a bottom plan view of the fourth example module.

Opposing link ends 406, 407 extend from the body 401 and, in use, are engaged via hinge pins to couple adjacent modules 400. The link ends 406 include a slotted opening 408 that defines a hinge axis 409 and the link ends 407 include a circular opening 410 that defines a hinge axis 411. As best shown in FIG. 28, a plane 412 on which both the hinge axes 409, 411 are positioned intersects the bearing 405 to define an upper portion and a lower portion of the bearing 405. Again, the positioning of the bearing 405 relative to the hinge axes 409, 411 helps to reduce forces and moments imparted to and transferred by the bearing 405, especially as the module 400 traverses a curved segment of a track.

A cover 413 extends laterally from the balance of the body 401 and establishes bounds of the void 404 that houses the bearing 405. The cover 413 also defines a downturned end wall 414 having a recessed slot 415 that is configured to receive a tab 416, that is, a portion of the tab 416 can extend partially through the slot 415 and into the void 404. The cover 413 also defines a countersunk opening 417 that is configured to receive a post 418, which is separate from the cover 413.

The generally cylindrical post 418 includes a shank portion 419 extending from an enlarged flange portion 420. Inserting the shank portion 419 downward through the countersunk opening 417 allows the enlarged flange portion 420 to seat in a countersink 421 formed in the cover 413, such that the enlarged flange portion 420 abuts the cover 413. The lower end 422 of the shank portion 419 includes an annular groove 423 that is engaged by a fastener in the form of a retaining ring 424, which when seated in the annular groove 423 captures the bearing 405 to the post 418 to inhibit the bearing 405 from moving along a post axis 425.

The tab 416 is again configured to both engage the bearing 405 and the post 418. The tab 416 includes an upper arm 426 and a lower arm 427 that are connected by an intermediate bridge portion 434. The upper arm 426 defines an upper opening 428 and the lower arm 427 defines a lower opening 429 that is coaxial with the upper opening 428. The upper opening 428 and the lower opening 429 are sized to receive the post 418.

To assemble the module 400, the upper arm 426 of the tab 416 is inserted through the recessed slot 415 in the end wall 414. The bearing 405 is then inserted between the upper arm 426 and the lower arm 427, thus sandwiching the bearing 405. With a central opening 430 of the bearing 405 coaxial with the openings 428, 429, the post 418 is inserted through the opening 417 in the cover 413 until the enlarged flange portion 420 seats in the countersink 421. The retaining ring 424 is finally secured in the annular groove 423 to capture the bearing 405 to the post 418, which also inhibits the post 418 from being removed from the opening 417 in the cover 413. When assembled, the tab 416 (e.g., the thickness of the upper arm 426 and the lower arm 427) helps position the bearing 405 relative to the balance of the module 400 to orient the bearing 405 to reduce excessive stresses on the bearing 405.

With specific reference to FIG. 28, when the bearing 405 is installed in the balance of the module 400, a guide channel 431 is established between a side face 432 of the link end 407 and a cylindrical engagement surface 433 of the bearing 405. As a result, the bearing 405 interfaces with a guide arm as the module 400 moves along the track (e.g., as shown with reference to FIG. 1). In one form, the cylindrical engagement surface 433 rolls against a tangentially oriented guide surface defined by the guide arm of the track to both aid the control of the modules 400 and to reduce the drag friction that typically occurs due to the relative sliding movement of the track and the module 400. Again, the bearing 405 in the example module 400 is completely housed within the upper plane 402 and the lower plane 403 to reduce the stresses transferred from the bearing 405 to the post 418 and the balance of the module. Furthermore, the bearing 405 is also completely within the void 404 (e.g., the bearing 405 is shown completely beneath the cover 413 in FIG. 29).

The four example modules are merely illustrative of the broader concepts and one skilled in the art will appreciate the various modifications and combinations that are within the scope of the broader concepts. For instance, the fastener may be a resilient, snap-fit structure integrally formed with a distal tip of a post, such that installing a bearing to the post radially compresses a splayed tip of the post, which allows the bearing to be mounted. The splayed tip then rebounds radially outward to axially capture the bearing to the post.

Figure 30:
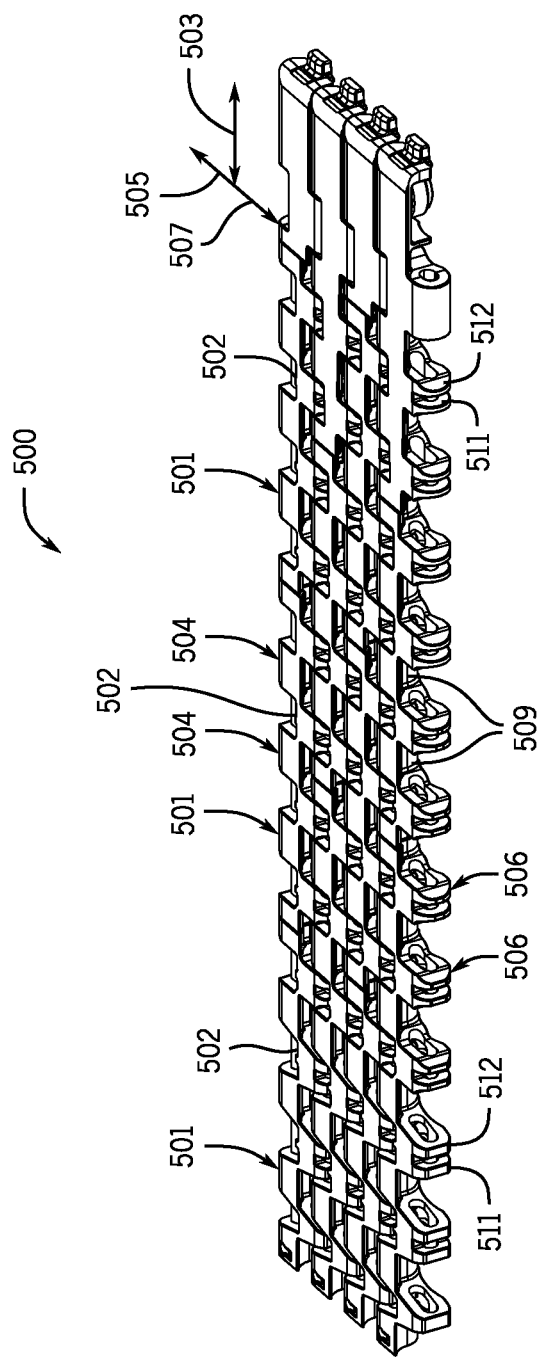
FIG. 30 is an isometric view of example modules linked together.
Figure 31:
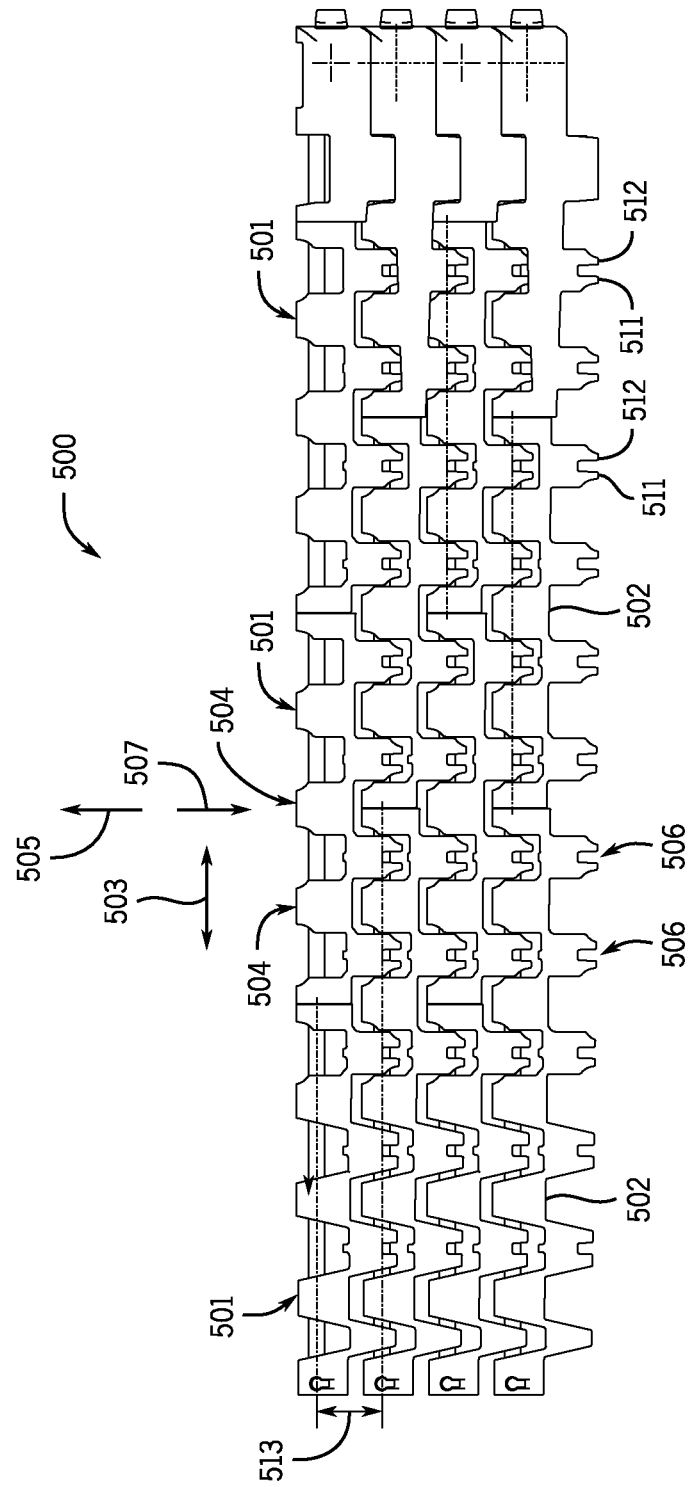
FIG. 31 is a top plan view of the example modules shown in FIG. 30.
Figure 32:
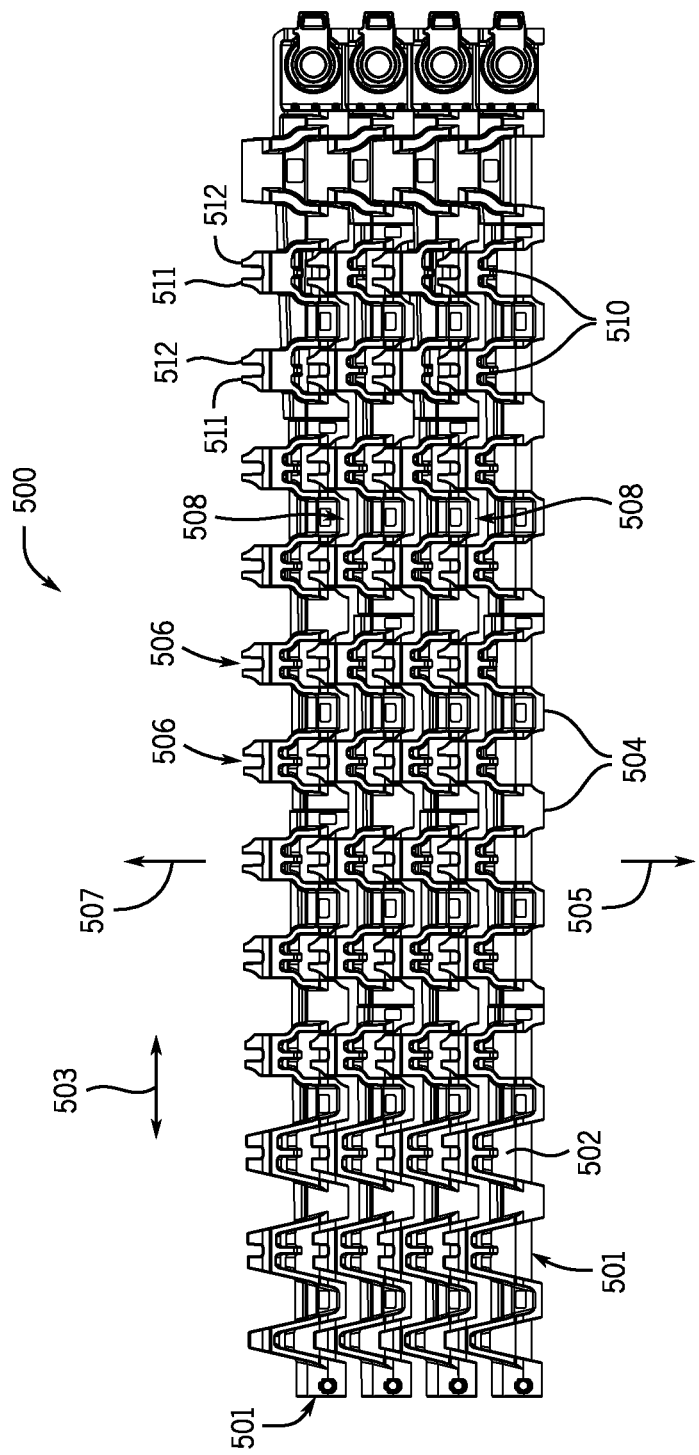
FIG. 32 is a bottom plan view of the example modules shown in FIG. 30.

FIGS. 30-32 illustrate a portion of a conveyor belt 500 having a series of modules 501 linked together to form the conveyor belt 500. The modules 501 are configured to inhibit erroneous engagement with a drive member (e.g., a drive sprocket) by limiting the available drive surfaces, while allowing the modules 501 to collapse as the pitch between successive hinge pins is reduced when traversing a curve.

Each module 501 includes a central web 502 extending in a lateral direction 503 (i.e., side-to-side as shown in FIG. 30). A series of first link ends 504 extend from the web 502 in a first direction 505 that is transverse to the lateral direction 503. A series of second link ends 506 also extend from the web 502 in a second direction 507 that is opposite to the first direction 505. With specific reference to FIG. 32, a series of drive pockets 508 are defined by a drive surface 509 (shown in FIG. 30) of the first link ends 504. In use, a drive sprocket is aligned with the successive drive pockets 508 of adjacent modules 501 and drives movement of the conveyor belt 500.

To inhibit misalignment of the modules 501 and the associated drive sprocket, the second link ends 506 include a central protrusion 510 that extends in the first direction 505. A pair of laterally spaced protrusions 511, 512 extend in the second direction 507 and are spaced laterally from an adjacent, central protrusion 510. As a result, when the adjacent modules 501 collapse (i.e., the pitch 513 shown in FIG. 31 is reduced) the central protrusion 510 will move between the pair of spaced protrusions 511, 512 of an adjacent module 501. Moreover, the protrusions 510, 511, 512 substantially encroach into the space between successive modules 501 that can be erroneously equated to the designed drive pockets 508, thereby inhibiting a tooth of a drive sprocket from fitting between and erroneously engaging the second link ends 506. In other forms, the protrusions may be greater or fewer in number and may take on a variety of form factors.

While there has been shown and described what is at present considered the preferred embodiments, it will be appreciated by those skilled in the art that various changes and modifications can be made without departing from the scope of the invention defined by the following claims (e.g., the relative proportions and dimension of the components can be altered, and, where applicable, various components can be integrally formed or single components can be separated into multiple pieces).

We claim:

1. A conveyor belt module comprising:
a body extending between a first plane and a second plane that is spaced apart from the first plane;
a link end formed in the body having an opening along a hinge axis;
a cover extending from the body in a direction of the hinge axis, the cover including an end wall having an opening;
a post extending from the cover along a post axis;
a tab engaged with the post and having a guide extending in the direction of the hinge axis, the tab extending through the opening of the cover to engage with the post;
a bearing rotatably engaged with the post; and
a fastener engaged with the post to capture the bearing between the cover and the fastener;
wherein the bearing is housed at least partially between the first plane and the second plane.

2. The conveyor belt module of claim 1 wherein:
the bearing is completely housed between the first plane and the second plane; and
a hinge plane that is defined along the hinge axis and parallel to the first plane bisects the bearing.

3. The conveyor belt module of claim 1 wherein the tab comprises:
an upper arm with an upper opening; and
a lower arm with a lower opening;
wherein the post extends through the upper opening and the lower opening; and
wherein the bearing is positioned between the upper arm and the lower arm.

4. The conveyor belt module of claim 1 wherein the tab comprises an arm having opposing resilient fingers secured to the post.

5. The conveyor belt module of claim 1 wherein the post is integral with the cover.

6. The conveyor belt module of claim 1 wherein the post is perpendicular to the cover.

7. The conveyor belt module of claim 1 wherein:
the post includes a shank portion and an enlarged flange portion; and
the shank portion extends through the opening of the cover and the enlarged flange portion abuts the cover.

8. The conveyor belt module of claim 1 wherein:
the post includes a receptacle;
the fastener includes a barbed shank portion and an enlarged flange portion; and
the barbed shank portion is engaged with the receptacle to inhibit translation of the fastener along the post axis and to capture the bearing to the post with the flange portion.

9. The conveyor belt module of claim 1 wherein:
the post includes an annular groove;
the fastener comprises a retaining ring; and
the retaining ring is seated in the annular groove to capture the bearing to the post.

10. The conveyor belt module of claim 1 wherein:
the post includes an opening;
the fastener comprises a rivet with a shank portion and an enlarged flange portion; and
the shank portion extends through the opening in the post and is secured to the cover to inhibit translation of the rivet along the post axis and to capture the bearing to the post with the enlarged flange portion.

11. A conveyor belt module comprising:
a body extending between a first plane and a second plane that is spaced apart from the first plane;
a link end formed in the body having an opening along a hinge axis;
a cover extending from the body in a direction of the hinge axis, the cover including an end wall having an opening;
a post extending from the cover along a post axis;
a bearing rotatably engaged with the post; and
a fastener engaged with the post to capture the bearing between the cover and the fastener;
a tab engaged with the post and having a guide extending in the direction of the hinge axis, the tab extending through the opening of the cover to engage with the post;
wherein the hinge axis is oriented perpendicular to the post axis; and
wherein the bearing is housed at least partially between the first plane and the second plane.

12. The conveyor belt module of claim 11 wherein the bearing is completely housed between the first plane and the second plane.

13. The conveyor belt module of claim 11 wherein a hinge plane that is defined along the hinge axis and parallel to the first plane bisects the bearing.

14. A conveyor belt module comprising:
a body extending between an upper transport plane and a lower body plane that is spaced apart from the upper transport plane;
a link end formed in the body having an opening along a hinge axis;
a cover extending from the body in a direction of the hinge axis, the cover including an end wall having an opening;

a post extending from the cover transverse to the hinge axis;

a tab engaged with the post and having a guide extending in the direction of the hinge axis, the tab extending through the opening of the cover to engage with the post;

a bearing rotatably engaged with the post; and a fastener engaged with the post to capture the bearing between the cover and the fastener;

wherein the bearing is housed at least partially between the upper transport plane and the lower body plane.

15. The conveyor belt module of claim 14 wherein the bearing is completely housed between the upper transport plane and the lower body plane.

16. A conveyor belt module comprising:

a web extending in a lateral direction;

a first link end extending from the web in a first direction that is transverse to the lateral direction and defining a drive pocket;

a second link end extending from the web in a second direction that is opposite to the first direction;

a first protrusion extending from the second link end in the first direction; and a second protrusion extending from the second link end in the second direction and offset in the lateral direction from the first protrusion; and wherein the first protrusion and the second protrusion are configured to inhibit driving engagement with a drive member.

17. A conveyor belt module comprising:

a body;

a first link end formed in the body having a first opening along a first hinge axis;

a second link end formed in the body having a second opening along a second hinge axis;

a hinge plane defined by the first hinge axis and the second hinge axis;

a cover extending from the body in a direction of the first hinge axis and the second hinge axis;

a post extending from the cover;

a bearing rotatably engaged with the post; and a fastener engaged with the post to capture the bearing between the cover and the fastener;

wherein the hinge plane intersects the bearing.

* * * * *